(12) United States Patent
Fei et al.

(10) Patent No.: US 11,632,763 B2
(45) Date of Patent: *Apr. 18, 2023

(54) RETUNING METHOD AND APPARATUS

(71) Applicant: HUAWEI TECHNOLOGIES CO., LTD., Guangdong (CN)

(72) Inventors: Yongqiang Fei, Shenzhen (CN); Zheng Yu, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

This patent is subject to a terminal disclaimer.

(21) Appl. No.: 17/348,160

(22) Filed: Jun. 15, 2021

(65) Prior Publication Data

US 2021/0314936 A1    Oct. 7, 2021

Related U.S. Application Data

(63) Continuation of application No. 16/520,728, filed on Jul. 24, 2019, now Pat. No. 11,057,895, which is a
(Continued)

(51) Int. Cl.
*H04W 72/04* (2009.01)
*H04L 5/00* (2006.01)
(Continued)

(52) U.S. Cl.
CPC ......... *H04W 72/048* (2013.01); *H04L 5/0037* (2013.01); *H04L 5/0051* (2013.01); *H04W 72/0446* (2013.01); *H04W 72/0453* (2013.01)

(58) Field of Classification Search
CPC ........... H04W 72/048; H04W 72/0446; H04W 72/0453; H04W 72/04; H04W 72/0493; H04L 5/0037; H04L 5/0051
See application file for complete search history.

(56) References Cited

U.S. PATENT DOCUMENTS

2010/0085901 A1    4/2010 Womack et al.
2011/0149814 A1    6/2011 Mottier
(Continued)

FOREIGN PATENT DOCUMENTS

CN    103428868    12/2013
CN    103828457    5/2014
(Continued)

OTHER PUBLICATIONS

3GPP TS 36.211 V14.1.0 (Dec. 2016), "3rd Generation Partnership Project; Technical Specification Group Radio Access Network; Evolved Universal Terrestrial Radio Access (E-UTRA); Physical channels and modulation (Release 14)," Dec. 2016, 175 pages.
(Continued)

*Primary Examiner* — Tejis Daya
(74) *Attorney, Agent, or Firm* — Fish & Richardson P.C.

(57) ABSTRACT

The present disclosure relates to retuning methods and apparatus. One example method includes determining a first resource and a second resource, where the first resource is used to receive a physical downlink control channel (PDCCH) or physical downlink shared channel (PDSCH), the first resource is determined based on a first frequency domain resource and M consecutive symbols of a downlink pilot timeslot in a special subframe, the second resource is used to send a sounding reference signal (SRS), the second resource is determined based on a second frequency domain resource and an uplink pilot timeslot in the special subframe, all or a part of the second frequency domain resource is not in the first frequency domain resource, and determining, in the last N consecutive symbols of the downlink pilot timeslot, a guard period for retuning.

18 Claims, 17 Drawing Sheets

S301

A terminal device determines a first resource and a second resource

S302

The terminal device determines, in a first subframe and/or a second subframe, a guard period for retuning, where the guard period is used to forbid the terminal to send an uplink signal in the guard period

Related U.S. Application Data continuation of application No. PCT/CN2017/072504, filed on Jan. 24, 2017.

(51) Int. Cl.
*H04W 72/0446* (2023.01)
*H04W 72/0453* (2023.01)

(56) References Cited

U.S. PATENT DOCUMENTS

| | | | |
|---|---|---|---|
| 2012/0314671 | A1 | 12/2012 | Noh et al. |
| 2013/0322363 | A1 | 12/2013 | Chen et al. |
| 2014/0169318 | A1* | 6/2014 | Takamatsu ........ H04W 72/0413 370/329 |
| 2015/0016377 | A1 | 1/2015 | Kim et al. |
| 2015/0043392 | A1* | 2/2015 | Susitaival ......... H04W 72/1205 370/280 |
| 2015/0358966 | A1* | 12/2015 | Zheng ............... H04W 72/0446 370/329 |
| 2016/0143032 | A1 | 5/2016 | Horiuchi |
| 2016/0249327 | A1 | 8/2016 | Chen et al. |
| 2016/0344527 | A1 | 11/2016 | Blankenship et al. |
| 2017/0208590 | A1 | 7/2017 | Kim et al. |
| 2018/0368199 | A1 | 12/2018 | Zeng et al. |
| 2019/0223175 | A1 | 7/2019 | Hakola et al. |

FOREIGN PATENT DOCUMENTS

| | | |
|---|---|---|
| CN | 104813724 | 7/2015 |
| WO | 2011134532 | 11/2011 |
| WO | 2014003104 | 1/2014 |
| WO | 2014180601 | 11/2014 |
| WO | 2016182291 | 11/2016 |

OTHER PUBLICATIONS

3GPP TS 36.213 V14.1.0 (Dec. 2016), "3rd Generation Partnership Project; Technical Specification Group Radio Access Network; Evolved Universal Terrestrial Radio Access (E-UTRA); Physical layer procedures (Release 14)," Dec. 2016, 414 pages.

Ericsson et al., "WF on VoLTE enhancements for FeMTC," 3GPP TSG Ran WG1 Meeting #87, R1-1613381, Reno, Nevada, USA, Nov. 14-18, 2016, 3 pages.

Extended European Search Report issued in European Application No. 17894529.1 dated Nov. 20, 2019, 8 pages.

Office Action issued in Chinese Application No. 201780084250.X dated Dec. 17, 2020, 8 pages.

Office Action issued in Indian Application No. 201937031210 dated Dec. 11, 2020, 6 pages.

PCT International Search Report and Written Opinion issued in International Application No. PCT/CN2017/072504 dated May 2, 2017, 19 pages (with English translation).

* cited by examiner

RETUNING METHOD AND APPARATUS

CROSS-REFERENCE TO RELATED APPLICATIONS

This application is a continuation of U.S. patent application Ser. No. 16/520,728, filed on Jul. 24, 2019, which is a continuation of International Application No. PCT/CN2017/072504, filed on Jan. 24, 2017. All of the afore-mentioned patent applications are hereby incorporated by reference in their entireties.

TECHNICAL FIELD

This application relates to the field of communications technologies, and in particular, to a retuning method and apparatus.

BACKGROUND

In a Long Term Evolution-Advanced (LTE-A) system, a base station needs to learn of wireless communication channel quality of user equipments (UE). Therefore, the base station schedules and instructs the UEs to send sounding reference signals (SRS) to detect channels. The UEs send the SRSs. The base station estimates uplink channel quality of the UEs in different frequency bands by receiving and detecting the SRSs, to provide a reference for resource block (RB) allocation, modulation and coding, multi-antenna transmission parameter setting, and the like. SRS detection has significant impact on performance of a wireless communications system. Especially in a multi-antenna communications system, SRS accuracy is critically related to downlink beamforming accuracy.

An SRS may be sent in the last N symbols of a subframe. If the SRS is sent in a normal subframe, a value of N is 1. If the SRS is sent in an UpPTS of a special subframe, a maximum value of N can be 6.

Currently, architectures of a further enhanced machine type communication (FeMTC) system and an enhanced machine type communication eMTC) system are based on the LTE-A system. Bandwidth-reduced low-complexity (BL) UE or coverage enhanced (CE) user equipment exists in the FeMTC system and the eMTC system. Uplink bandwidth supported by these types of UEs may be less than system bandwidth. Therefore, an SRS transmission frequency band of UE may exceed uplink transmission bandwidth of the UE. In the foregoing case, the UE needs to perform retuning, to change a frequency domain position occupied by the UE to transmit an uplink resource, so as to transmit symbols in different frequency bands.

A time period needs to be occupied during retuning by the UE. The time period may be referred to as a guard period. The UE cannot send a signal in the guard period. In addition, guard periods required for retuning by different UEs depend on retuning capabilities of the UEs. A guard period required by UE is usually {0, 1, 2} symbols. When the time period required for retuning is 0 symbols, the UE can successfully send all SRSs and other uplink transmission signals. When the time period required for retuning is one symbol or two symbols, the UE cannot transmit a signal or signals in one or two symbols during retuning. In the LTE-A system, when determining that an SRS transmission frequency band exceeds uplink transmission bandwidth of UE so that retuning needs to be performed, the UE always preferentially uses a symbol occupied for an SRS as a guard period. In other words, no signal is sent in a time period in which the SRS needs to be transmitted. However, considering a performance requirement of the LTE-A system, SRS coverage needs to be enhanced. Therefore, the SRS needs to be repeatedly sent in a plurality of symbols in time domain. If the UE does not preferentially transmit the SRS during retuning, an SRS coverage enhancement requirement of the LTE-A system cannot be met.

SUMMARY

Embodiments of this application provide a retuning method and apparatus. During retuning by a terminal device, transmission of another signal less important than an SRS is preferentially dropped, to meet an SRS coverage enhancement requirement of a communications system.

According to a first aspect, an embodiment of this application provides a retuning method, including:

determining, by a terminal device, a first resource and a second resource, where the first resource is used to send a sounding reference signal, the first resource is determined based on a first frequency domain resource and at least one symbol of a first subframe, and the at least one symbol includes the last symbol of the first subframe; the second resource is used to send a physical uplink shared channel or a physical uplink control channel, the second resource is determined based on a second frequency domain resource and a second subframe, and all or a part of the first frequency domain resource is not in the second frequency domain resource; and the first subframe is the first subframe in two consecutive subframes, and the second subframe is the second subframe in the two consecutive subframes; and determining, by the terminal device in the first subframe and/or the second subframe, a guard period for retuning, where the guard period is used to forbid the terminal device to send an uplink signal in the guard period.

It should be noted that all or a part of the first frequency domain resource is not in the second frequency domain resource, or the first frequency domain resource does not fully overlap with the second frequency domain resource.

That the first frequency domain resource does not fully overlap with the second frequency domain resource means that no overlapping part exists between a subcarrier range within which the first frequency domain resource falls and a subcarrier range within which the second frequency domain resource falls, or both an overlapping part and a non-overlapping part exist between a subcarrier range within which the first frequency domain resource falls and a subcarrier range within which the second frequency domain resource falls.

According to the foregoing design, in this embodiment of this application, SRS sending is not preferentially dropped. Instead, the guard period for retuning is determined in the first subframe and/or the second subframe. This enhances SRS coverage based on terminal retuning.

Optionally, the terminal device determines, at least in the second subframe, the guard period for retuning. In the prior art, when a guard period is required for retuning, SRS sending is preferentially dropped. The last one or more symbols in symbols of the first subframe that are used to send the SRS are usually used as the guard period. In other words, the SRS and other uplink signals are forbidden to be sent in the last one or more symbols of the first subframe. According to the solution provided in this embodiment of this application, the SRS is preferentially reserved instead of being preferentially dropped, and transmission in the first one or more symbols of the second subframe are preferentially dropped, so that the first one or more symbols of the second subframe are used as the guard period. This enhances SRS coverage.

In a possible design, the determining, by the terminal device in the first subframe and/or the second subframe, a guard period for retuning includes:

determining, by the terminal device, that the guard period is in the first symbol in a plurality of symbols in the second subframe that are used to send the physical uplink shared channel or the physical uplink control channel.

According to the foregoing design, transmission of the physical uplink shared channel or the physical uplink control channel in one symbol is dropped, to enhance SRS coverage with minimal impact on signal transmission.

In a possible design, the determining, by the terminal device in the first subframe and/or the second subframe, a guard period for retuning includes:

if the second resource is used to send the physical uplink control channel, determining, by the terminal device, that the guard period is in the last symbol of the first subframe and the first symbol in a plurality of symbols in the second subframe that are used to send the physical uplink control channel.

According to the solution provided in this embodiment of this application, when the first two symbols of the second subframe are used to send the PUCCH, in an SRS coverage enhancement scenario, SRS transmission needs to be reserved as far as possible, in addition, a signal carried in the PUCCH is a control signal, and the control signal is of relatively high importance, and therefore PUCCH signal transmission also needs to be reserved as far as possible. Therefore, transmission in one symbol selected from symbols used to transmit the SRS and transmission in one symbol selected from symbols used to transmit the PUCCH are dropped. Specifically, the terminal device uses the last symbol of the first subframe and the first symbol of the second subframe as the guard period used to forbid the terminal device to send an uplink signal. This enhances SRS coverage with minimal impact on signal transmission.

In a possible design, the determining, by the terminal device in the first subframe and/or the second subframe, a guard period for retuning includes:

if the second resource is used to send the physical uplink shared channel, determining, by the terminal device, that the guard period is in the first two symbols in a plurality of consecutive symbols in the second subframe that are used to send the physical uplink shared channel.

According to the foregoing design, when the first two symbols of the second subframe are used to send the PUSCH, in an SRS coverage enhancement scenario. SRS transmission needs to be reserved as far as possible; in addition, a signal carried in the PUSCH is a data signal, and the data signal is of relatively low importance. Therefore, PUSCH transmission in the first two symbols is chosen to be dropped. Specifically, the terminal device uses the first two symbols of the second subframe as the guard period used to forbid the terminal device to send an uplink signal. This enhances SRS coverage with minimal impact on signal transmission.

In a possible design, before the determining, by the terminal device in the first subframe and/or the second subframe, a guard period for retuning, the method further includes:

receiving, by the terminal device, first indication information, where the first indication information is used to instruct the terminal device to determine the guard period in the first subframe and/or the second subframe.

In a possible design, the receiving, by the terminal device, first indication information includes:

receiving, by the terminal device, radio resource control signaling, where the radio resource control signaling carries the first indication information; or receiving, by the terminal device, downlink control information, where the downlink control information includes the first indication information.

According to the foregoing design, the indication information is carried in higher layer signaling to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

In a possible design, before the determining a guard period in the first subframe and/or the second subframe, the method further includes:

receiving, by the terminal device, second indication information, where the second indication information is used to indicate that the guard period is in the last symbol of the first subframe; or if the sounding reference signal is sent only in the last symbol of the first subframe, the second indication information is used to indicate that the guard period is in the last symbol of the first subframe and the first symbol of the second subframe; or if the sounding reference signal is sent only in at least two symbols of the first subframe, and the at least two symbols include the last symbol of the first subframe, the second indication information is used to indicate that the guard period is in a plurality of consecutive symbols from the first symbol to the last symbol in the at least two symbols of the first subframe.

In a possible design, the receiving, by the terminal device, second indication information includes:

receiving, by the terminal device, radio resource control signaling, where the radio resource control signaling carries the second indication information; or receiving, by the terminal device, downlink control information, where the downlink control information includes the second indication information.

According to the foregoing design, the indication information is carried in higher layer signaling to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

In a possible design, bandwidth of the first frequency domain resource is equal to transmission bandwidth of the sounding reference signal, and the second frequency domain resource is a narrowband resource. Bandwidth of the narrowband resource is equal to maximum bandwidth that can be supported by the terminal device, or bandwidth of the narrowband resource is equal to a maximum quantity of physical resource blocks that can be supported by the terminal device. The terminal device is a bandwidth-reduced low-complexity (BL) terminal device, a coverage enhanced (CE) terminal device, or a machine type communication (MTC) terminal device.

The narrowband resource is described with respect to system bandwidth. When UE capabilities are limited, for example, costs are limited and power consumption is limited, the second frequency domain resource may be the narrowband resource. Supporting larger bandwidth requires higher costs and higher power consumption. Therefore, using the narrowband resource can effectively reduce costs and total power consumption, improve transmit power in a unit frequency band to extend an uplink coverage area, and so on.

According to a second aspect, an embodiment of this application provides a retuning method, including:

determining, by a network device, a guard period for retuning from a first resource to a second resource by a terminal device, where the guard period is in a first subframe and/or a second subframe, the guard period is used to forbid the terminal device to send an uplink signal in the guard period, the first resource is used by the terminal device to send a sounding reference signal, the first resource is determined based on a first frequency domain resource and at least one symbol of the first subframe, and the at least one symbol includes the last symbol of the first subframe; the second resource is used by the terminal device to send a physical uplink control channel or a physical uplink shared channel, the second resource is determined based on a second frequency domain resource and the second subframe, and all or a part of the first frequency domain resource is not in the second frequency domain resource; and the first subframe is the first subframe in two consecutive subframes, and the second subframe is the second subframe in the two consecutive subframes; and determining, by the network device, that no uplink signal of the terminal device exists in the guard period.

According to the foregoing design, in this embodiment of this application, SRS sending is not preferentially dropped. Instead, the guard period for retuning is determined in the first subframe and/or the second subframe. This enhances SRS coverage based on terminal retuning.

Optionally, in a resource other than the guard period in the first resource and the second resource, the network device monitors the sounding reference signal sent by the terminal device, and monitors the physical uplink shared channel or the physical uplink control channel that is sent by the terminal device.

In a possible design, the method further includes:

sending, by the network device, first indication information to the terminal device, where the first indication information is used to indicate that the guard period is in the first subframe and/or the second subframe.

According to the foregoing design, the indication information is used to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

In a possible design, the first indication information is used to indicate that the guard period is in the first symbol in a plurality of consecutive symbols in the second subframe that are used to send the physical uplink shared channel or the physical uplink control channel.

According to the foregoing design, transmission of the physical uplink shared channel or the physical uplink control channel in one symbol is dropped, to enhance SRS coverage with minimal impact on signal transmission.

In a possible design, the first indication information is used to indicate that the guard period is in the last symbol of the first subframe and the first symbol in a plurality of symbols in the second subframe that are used by the terminal device to send the physical uplink control channel.

According to the solution provided in this embodiment of this application, when the first two symbols of the second subframe are used to send the PUCCH, in an SRS coverage enhancement scenario, SRS transmission needs to be reserved as far as possible; in addition, a signal carried in the PUCCH is a control signal, and the control signal is of relatively high importance, and therefore PUCCH signal transmission also needs to be reserved as far as possible. Therefore, transmission in one symbol selected from symbols used to transmit the SRS and transmission in one symbol selected from symbols used to transmit the PUCCH are dropped. Specifically, the terminal device uses the last symbol of the first subframe and the first symbol of the second subframe as the guard period used to forbid the terminal device to send an uplink signal. This enhances SRS coverage with minimal impact on signal transmission.

In a possible design, the first indication information is used to indicate that the guard period is in the first two symbols in a plurality of symbols in the second subframe that are used by the terminal device to send the physical uplink shared channel.

According to the foregoing design, when the first two symbols of the second subframe are used to send the PUSCH, in an SRS coverage enhancement scenario. SRS transmission needs to be reserved as far as possible; in addition, a signal carried in the PUSCH is a data signal, and the data signal is of relatively low importance. Therefore, PUSCH transmission in the first two symbols is chosen to be dropped. Specifically, the terminal device uses the first two symbols of the second subframe as the guard period used to forbid the terminal device to send an uplink signal. This enhances SRS coverage with minimal impact on signal transmission.

In a possible design, the sending, by the network device, first indication information to the terminal device includes:

sending, by the network device, radio resource control signaling to the terminal device, where the radio resource control signaling carries the first indication information; or sending, by the network device, downlink control information to the terminal device, where the downlink control information includes the first indication information.

According to the foregoing design, the indication information is carried in higher layer signaling to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

In a possible design, the method further includes:

sending, by the network device, second indication information to the terminal device, where the second indication information is used to instruct the terminal device to generate the guard period in the last symbol of the first subframe; or if the sounding reference signal is sent only in the last symbol of the first subframe, the second indication information is used to indicate that the guard period is in the last symbol of the first subframe and the first symbol of the second subframe; or if the sounding reference signal is sent in at least two consecutive symbols of the first subframe, and the at least two consecutive symbols include the last two symbols of the first subframe, the second indication information is used to indicate that the guard period is in the last two symbols of the first subframe.

In a possible design, the sending, by the network device, second indication information to the terminal device includes:

sending, by the network device, radio resource control signaling to the terminal device, where the radio resource control signaling carries the second indication information;

or sending, by the network device, downlink control information to the terminal device, where the downlink control information includes the second indication information.

According to a third aspect, based on a same inventive concept as the method, an embodiment of this application provides a retuning apparatus, where the apparatus is applied to a terminal device and includes:

a first determining module, configured to determine a first resource and a second resource, where the first resource is used to send a sounding reference signal, the first resource is determined based on a first frequency domain resource and at least one symbol of a first subframe, and the at least one symbol includes the last symbol of the first subframe; the second resource is used to send a physical uplink shared channel or a physical uplink control channel, the second resource is determined based on a second frequency domain resource and a second subframe, and all or a part of the first frequency domain resource is not in the second frequency domain resource; and the first subframe is the first subframe in two consecutive subframes, and the second subframe is the second subframe in the two consecutive subframes; and a second determining module, configured to determine, in the first subframe and/or the second subframe, a guard period for retuning, where the guard period is used to forbid the terminal device to send an uplink signal in the guard period.

In a possible design, the second determining module is specifically configured to determine that the guard period is in the first symbol in a plurality of symbols in the second subframe that are used to send the physical uplink shared channel or the physical uplink control channel.

In a possible design, if the second resource is used to send the physical uplink control channel, the second determining module is specifically configured to determine that the guard period is in the last symbol of the first subframe and the first symbol in a plurality of symbols in the second subframe that are used to send the physical uplink control channel.

In a possible design, if the second resource is used to send the physical uplink shared channel, the second determining module is specifically configured to determine that the guard period is in the first two symbols in a plurality of consecutive symbols in the second subframe that are used to send the physical uplink shared channel.

In a possible design, the apparatus further includes:

a receiving module, configured to receive first indication information before the second determining module determines, in the first subframe and/or the second subframe, the guard period for retuning, where the first indication information is used to instruct the terminal device to determine the guard period in the first subframe and/or the second subframe.

In a possible design, the receiving module is specifically configured to:

receive radio resource control signaling, where the radio resource control signaling carries the first indication information; or receive downlink control information, where the downlink control information includes the first indication information.

In a possible design, the apparatus further includes:

a receiving module, configured to receive second indication information before the second determining module determines the guard period in the first subframe and/or the second subframe, where the second indication information is used to indicate that the guard period is in the last symbol of the first subframe; or if the sounding reference signal is sent only in the last symbol of the first subframe, the second indication information is used to indicate that the guard period is in the last symbol of the first subframe and the first symbol of the second subframe; or if the sounding reference signal is sent only in at least two symbols of the first subframe, and the at least two symbols include the last symbol of the first subframe, the second indication information is used to indicate that the guard period is in a plurality of consecutive symbols from the first symbol to the last symbol in the at least two symbols of the first subframe.

In a possible design, the receiving module is specifically configured to:

receive radio resource control signaling, where the radio resource control signaling carries the second indication information; or receive downlink control information, where the downlink control information includes the second indication information.

In a possible design, bandwidth of the first frequency domain resource is equal to transmission bandwidth of the sounding reference signal, and the second frequency domain resource is a narrowband resource.

In a possible design, bandwidth of the narrowband resource is equal to maximum bandwidth that can be supported by the terminal device, or bandwidth of the narrowband resource is equal to a maximum quantity of physical resource blocks that can be supported by the terminal device.

In a possible design, the terminal device is a bandwidth-reduced low-complexity (BL) terminal device, a coverage enhanced (CE) terminal device, or a machine type communication (MTC) terminal device.

According to a fourth aspect, an embodiment of this application provides a retuning apparatus, where the apparatus is applied to a network device and includes:

a first determining module, configured to determine a guard period for retuning from a first resource to a second resource by a terminal device, where the guard period is in a first subframe and/or a second subframe, the guard period is used to forbid the terminal device to send an uplink signal in the guard period, the first resource is used by the terminal device to send a sounding reference signal, the first resource is determined based on a first frequency domain resource and at least one symbol of the first subframe, and the at least one symbol includes the last symbol of the first subframe; the second resource is used by the terminal device to send a physical uplink control channel or a physical uplink shared channel, the second resource is determined based on a second frequency domain resource and the second subframe, and all or a part of the first frequency domain resource is not in the second frequency domain resource; and the first subframe is the first subframe in two consecutive subframes, and the second subframe is the second subframe in the two consecutive subframes; and a second determining module, configured to determine that no uplink signal of the terminal device exists in the guard period.

In a possible design, the apparatus further includes:

a sending module, configured to send first indication information to the terminal device, where the first indication information is used to indicate that the guard period is in the first subframe and/or the second subframe.

In a possible design, the first indication information is used to indicate that the guard period is in the first symbol in a plurality of consecutive symbols in the second subframe that are used to send the physical uplink shared channel or the physical uplink control channel.

In a possible design, the first indication information is used to indicate that the guard period is in the last symbol of the first subframe and the first symbol in a plurality of symbols in the second subframe that are used by the terminal device to send the physical uplink control channel.

In a possible design, the first indication information is used to indicate that the guard period is in the first two symbols in a plurality of symbols in the second subframe that are used by the terminal device to send the physical uplink shared channel.

In a possible design, the sending module is specifically configured to:

send radio resource control signaling to the terminal device, where the radio resource control signaling carries the first indication information; or send downlink control information to the terminal device, where the downlink control information includes the first indication information.

In a possible design, the apparatus further includes;

a sending module, configured to send second indication information to the terminal device, where the second indication information is used to instruct the terminal device to generate the guard period in the last symbol of the first subframe; or if the sounding reference signal is sent only in the last symbol of the first subframe, the second indication information is used to indicate that the guard period is in the last symbol of the first subframe and the first symbol of the second subframe; or if the sounding reference signal is sent in at least two consecutive symbols of the first subframe, and the at least two consecutive symbols include the last two symbols of the first subframe, the second indication information is used to indicate that the guard period is in the last two symbols of the first subframe.

In a possible design, the sending module is specifically configured to:

send radio resource control signaling to the terminal device, where the radio resource control signaling carries the second indication information; or send downlink control information to the terminal device, where the downlink control information includes the second indication information.

According to a fifth aspect, an embodiment of this application provides a retuning method, including:

determining, by a terminal device, a first resource and a second resource, where the first resource is used to receive a physical downlink control channel or a physical downlink shared channel, and the first resource is determined based on a first frequency domain resource and M consecutive symbols of a downlink pilot timeslot in a special subframe; and the second resource is used to send a sounding reference signal, the second resource is determined based on a second frequency domain resource and an uplink pilot timeslot in the special subframe, and all or a part of the second frequency domain resource is not in the first frequency domain resource; and determining, by the terminal device in the last N consecutive symbols of the downlink pilot timeslot or in the uplink pilot timeslot, a guard period for retuning, where the guard period is used to forbid the terminal device to transmit/receive a signal in the guard period, both M and N are positive integers, and M is greater than or equal to N.

According to the foregoing design, the guard period for retuning is determined in the last N consecutive symbols of the downlink pilot timeslot or in the uplink pilot timeslot. A downlink control channel or a downlink shared channel transmitted in the downlink pilot timeslot is less important than the SRS that needs coverage enhancement. Therefore, reception of the downlink control channel or the downlink shared channel may be chosen to be dropped or SRS transmission may be chosen to be dropped depending on a requirement, to improve flexibility and meet SRS coverage enhancement requirements of some terminal devices.

In a possible design, before the determining, by the terminal device in the last N consecutive symbols of the downlink pilot timeslot, a guard period for retuning, the method further includes:

receiving, by the terminal device, first indication information, where the first indication information is used to instruct the terminal device to determine the guard period in the last N consecutive symbols of the downlink pilot timeslot.

According to the foregoing design, the indication information is used to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

In a possible design, the receiving, by the terminal device, first indication information includes:

receiving, by the terminal device, radio resource control signaling, where the radio resource control signaling carries the first indication information; or receiving, by the terminal device, downlink control information, where the downlink control information includes the first indication information.

According to the foregoing design, the indication information is carried in higher layer signaling to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

In a possible design, before the determining, by the terminal device in the uplink pilot timeslot, a guard period for retuning, the method further includes:

receiving, by the terminal device, second indication information, where the second indication information is used to indicate that the guard period is in the uplink pilot timeslot.

In a possible design, the receiving, by the terminal device, second indication information includes:

receiving, by the terminal device, radio resource control signaling, where the radio resource control signaling carries the second indication information; or receiving, by the terminal device, downlink control information, where the downlink control information includes the second indication information.

According to the foregoing design, the indication information is carried in higher layer signaling to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

In a possible design, the first frequency domain resource is a narrowband resource, and bandwidth of the second frequency domain resource is equal to transmission bandwidth of the sounding reference signal.

In a possible design, bandwidth of the narrowband resource is equal to maximum bandwidth that can be supported by the terminal device, or bandwidth of the narrowband resource is equal to a maximum quantity of physical resource blocks that can be supported by the terminal device.

In a possible design, the terminal device is a bandwidth-reduced low-complexity (BL) terminal device, a coverage enhanced (CE) terminal device, or a machine type communication (MTC) terminal device.

According to a sixth aspect, an embodiment of this application provides a retuning method, including:

determining, by a network device, a guard period for retuning from a first resource to a second resource by a terminal device, where the guard period is in the last N consecutive symbols of a downlink pilot timeslot in a special subframe or the guard period is in an uplink pilot timeslot, and the guard period is used to forbid the terminal device to transmit/receive a signal in the guard period; the first resource is used to receive a physical downlink control channel or a physical downlink shared channel, and the first resource is determined based on a first frequency domain resource and M consecutive symbols of the downlink pilot timeslot; the second resource is used to send a sounding reference signal, the second resource is determined based on a second frequency domain resource and the uplink pilot timeslot in the special subframe, and all or a part of the second frequency domain resource is not in the first frequency domain resource; and both M and N are positive integers, and M is greater than or equal to N; and determining, by the network device, that no signal of the terminal device exists in the guard period.

According to the foregoing design, the guard period for retuning is determined in the last N consecutive symbols of the downlink pilot timeslot or in the uplink pilot timeslot. A downlink control channel or a downlink shared channel transmitted in the downlink pilot timeslot is less important than the SRS that needs coverage enhancement. Therefore, reception of the downlink control channel or the downlink shared channel may be chosen to be dropped or SRS transmission may be chosen to be dropped depending on a requirement, to improve flexibility and meet SRS coverage enhancement requirements of some terminal devices.

In a possible design, the method further includes:

sending, by the network device, indication information to the terminal device, where the indication information is used to indicate that the guard period is in the last N consecutive symbols of the downlink pilot timeslot or indicate that the guard period is in the uplink pilot timeslot.

In a possible design, the sending, by the network device, indication information to the terminal device includes:

sending, by the network device, radio resource control signaling to the terminal device, where the radio resource control signaling carries the indication information; or sending, by the network device, downlink control information to the terminal device, where the downlink control information includes the indication information.

According to the foregoing design, the indication information is carried in higher layer signaling to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

According to a seventh aspect, an embodiment of this application provides a retuning apparatus, where the apparatus is applied to a terminal device and includes:

a first determining module, configured to determine a first resource and a second resource, where the first resource is used to receive a physical downlink control channel or a physical downlink shared channel, and the first resource is determined based on a first frequency domain resource and M consecutive symbols of a downlink pilot timeslot in a special subframe; and the second resource is used to send a sounding reference signal, the second resource is determined based on a second frequency domain resource and an uplink pilot timeslot in the special subframe, and all or a part of the second frequency domain resource is not in the first frequency domain resource; and a second determining module, configured to determine, in the last N consecutive symbols of the downlink pilot timeslot or in the uplink pilot timeslot, a guard period for retuning, where the guard period is used to forbid the terminal device to transmit/receive a signal in the guard period, both M and N are positive integers, and M is greater than or equal to N.

In a possible design, the apparatus further includes:

a receiving module, configured to receive first indication information before the second determining module determines, in the last N consecutive symbols of the downlink pilot timeslot, the guard period for retuning, where the first indication information is used to instruct the terminal device to determine the guard period in the last N consecutive symbols of the downlink pilot timeslot.

In a possible design, the receiving module is specifically configured to:

receive radio resource control signaling, where the radio resource control signaling carries the first indication information; or receive downlink control information, where the downlink control information includes the first indication information.

In a possible design, the apparatus further includes:

a receiving module, configured to receive second indication information before the second determining module determines, in the uplink pilot timeslot, the guard period for retuning, where the second indication information is used to indicate that the guard period is in the uplink pilot timeslot.

In a possible design, the receiving module is specifically configured to: receive radio resource control signaling, where the radio resource control signaling carries the second indication information; or receive downlink control information, where the downlink control information includes the second indication information.

In a possible design, the first frequency domain resource is a narrowband resource, and bandwidth of the second frequency domain resource is equal to transmission bandwidth of the sounding reference signal.

In a possible design, bandwidth of the narrowband resource is equal to maximum bandwidth that can be supported by the terminal device, or bandwidth of the narrowband resource is equal to a maximum quantity of physical resource blocks that can be supported by the terminal device.

In a possible design, the terminal device is a bandwidth-reduced low-complexity (BL) terminal device, a coverage enhanced (CE) terminal device, or a machine type communication (MTC) terminal device.

According to an eighth aspect, an embodiment of this application provides a retuning apparatus, where the apparatus is applied to a network device and includes:

a first determining module, configured to determine a guard period for retuning from a first resource to a second resource by a terminal device, where the guard period is in the last N consecutive symbols of a downlink pilot timeslot in a special subframe or the guard period is in an uplink pilot timeslot, and the guard period is used to forbid the terminal device to transmit/receive a signal in the guard period; the first resource is used to receive a physical downlink control channel or a physical downlink shared channel, and the first resource is determined based on a first frequency domain resource and M consecutive symbols of the downlink pilot timeslot; the second resource is used to send a sounding reference signal, the second resource is determined based on a second frequency domain resource and the uplink pilot timeslot in the special subframe, and all or a part of the second frequency domain resource is not in the first frequency domain resource; and both M and N are positive integers, and M is greater than or equal to N; and a second determining module, configured to determine that no signal of the terminal device exists in the guard period.

In a possible design, the apparatus further includes:

a sending module, configured to send indication information to the terminal device, where the indication information is used to indicate that the guard period is in the last N consecutive symbols of the downlink pilot timeslot or indicate that the guard period is in the uplink pilot timeslot.

In a possible design, the sending module is specifically configured to:

send radio resource control signaling to the terminal device, where the radio resource control signaling carries the indication information; or send downlink control information to the terminal device, where the downlink control information includes the indication information.

According to a ninth aspect, an embodiment of this application further provides a terminal device, where the terminal device includes a transceiver, a processor, and a memory, the transceiver is configured to transmit/receive data, the memory is used to store a software program, and the processor is configured to: read the software program stored in the memory, and perform the method according to the first aspect or any one of the designs in the first aspect, or perform the method according to the fifth aspect or any one of the designs in the fifth aspect.

According to a tenth aspect, an embodiment of this application provides a network device, where the network device includes a transceiver, a processor, and a memory, the transceiver is configured to transmit/receive data, the memory is configured to store a software program, and the processor is configured to: read the software program stored in the memory, and perform the method according to the second aspect or any one of the designs in the second aspect, or perform the method according to the sixth aspect or any one of the designs in the sixth aspect.

According to an eleventh aspect, an embodiment of this application further provides a computer storage medium, where the storage medium stores a software program; and when the software program is read and executed by one or more processors, the method according to the first aspect or any one of the designs in the first aspect, the method according to the second aspect or any one of the designs in the second aspect, the method according to the fifth aspect or any one of the designs in the fifth aspect, or the method according to the sixth aspect or any one of the designs in the sixth aspect may be performed.

DESCRIPTION OF EMBODIMENTS

The embodiments of this application may be applied to the 4th generation mobile communication (4G) system, for example, a Long Term Evolution (LTE) time division duplex (TDD) system, an LTE-ATDD system, or an eMTC or FeMTC system based on the LTE TDD system or the LTE-A TDD system, or may be applied to the 5th generation mobile communication (5G) system. Alternatively, the embodiments of this application may be applied to another communications system provided that an entity needs to transmit a data signal and a reference signal to another entity in the communications system, for example, the communications system shown in FIG. 1.

Figure 1:
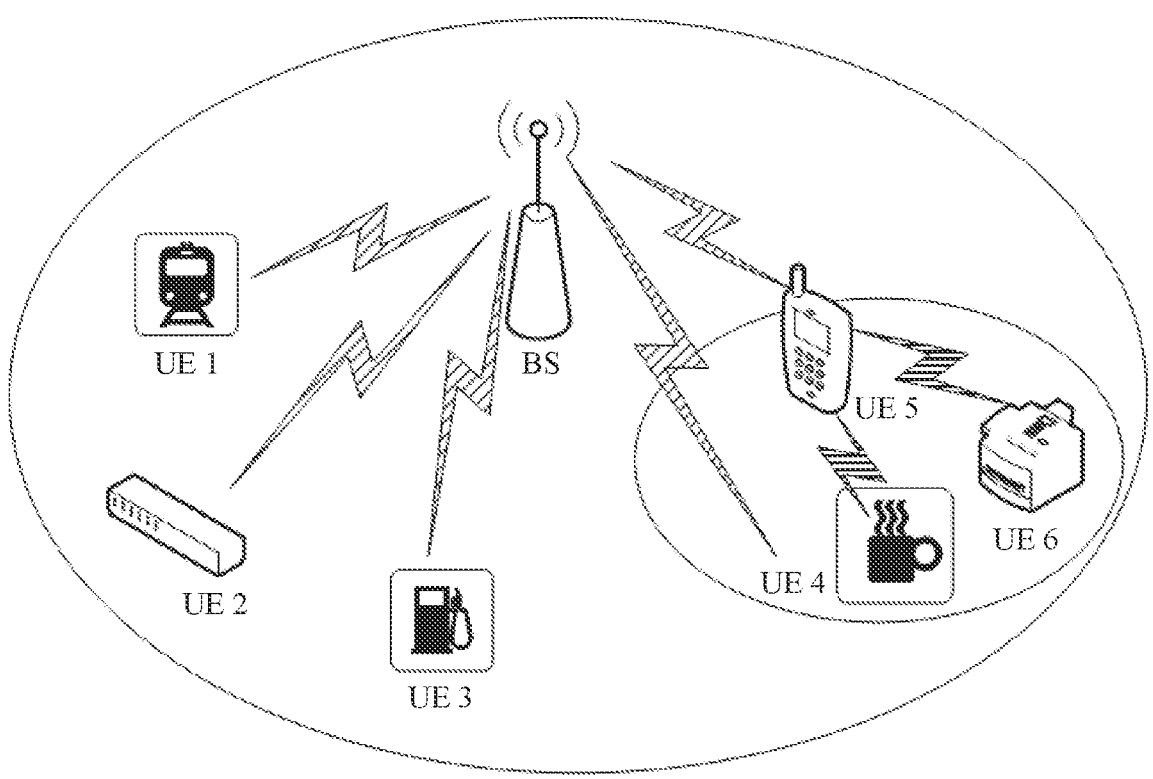
FIG. 1 is a schematic diagram of a system architecture according to an embodiment of this application.

As shown in FIG. 1, a base station (BS) and UE 1 to UE 6 constitute a communications system. In the communications system, the base station sends a scheduling message to one or more UEs in the UE 1 to the UE 6. In addition. UE 4 to UE 6 may also constitute a communications system. In the communications system, UE 5 may send scheduling information to one or more UEs in the UE 4 and the UE 6.

In addition, a terminal in the embodiments of this application may also be referred to as an access terminal, user equipment (UE), a subscriber unit, a mobile device, or the like. The terminal may be a bandwidth-reduced low-complexity (BL) terminal, a coverage enhanced (CE) terminal, a machine type communication (MTC) terminal, or the like. For ease of description, the terminal is described as UE in this application.

A network device in the embodiments of this application is an entity configured to receive or send a signal on a network side, for example, a base station. The base station may be a base transceiver station (BTS) in a Global System for Mobile Communications (GSM) or a Code Division Multiple Access (CDMA) system, may be a NodeB in a Wideband Code Division Multiple Access (WCDMA) system, or may be an evolved NodeB (eNB or eNodeB) in an LTE system, or a base station device, a small cell device, a wireless access node (WiFi AP), a Worldwide Interoperability for Microwave Access base station (WiMAX BS), or the like in a future 5G network. This is not limited in this application.

It should be noted that, "a plurality of" means "two or more" in this application. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. It should be understood that although terms "first", "second", "third", and the like may be used in the embodiments of this application to describe various symbols, the symbols are not limited by the terms. These terms are merely used to distinguish between different symbols.

In addition, it should be noted that "guard period (guard period)" in the embodiments of this application may also be referred to as a guard interval. There are two types of guard periods. One type is a guard period for retuning (guard period for retuning) by UE. The other type is a guard period included in a special subframe. The guard period in the special subframe is used for switching from downlink transmission to uplink transmission, to avoid interference caused by a downlink signal to an uplink signal. In the embodiments of this application, to distinguish between the two types of guard periods, in the following description, the guard period for switching from downlink transmission to uplink transmission is briefly referred to as a guard interval, and the guard period for retuning by the UE is briefly referred to as a guard period.

A symbol in the embodiments of this application includes but is not limited to an orthogonal frequency division multiplexing (OFDM) symbol, a sparse code multiple access (SCMA) symbol, a filtered orthogonal frequency division multiplexing (F-OFDM) symbol, or a non-orthogonal multiple access (NOMA) symbol, and may be specifically determined depending on an actual situation. Details are not described herein.

With respect to a subframe in the embodiments of this application, one subframe occupies a frequency domain resource of entire system bandwidth in frequency domain, and is a time domain resource of fixed duration in time domain. The subframe may include K symbols. A value of K may be determined depending on an actual situation, and is not limited herein. For example, in LTE, one subframe occupies 14 consecutive symbols in time domain; or in a 5G system, one subframe occupies 28/56 consecutive symbols in time domain when a subcarrier width is 30 kHz %60 kHz.

Subframes may include an uplink subframe, a downlink subframe, and a special subframe. The uplink subframe is used to transmit an uplink signal, and the downlink subframe is used to transmit a downlink signal.

The special subframe is divided in time domain. One special subframe may be divided into three parts: a downlink pilot timeslot (DwPTS), a guard interval (GP), and an uplink pilot timeslot (UpPTS).

The DwPTS is used for downlink transmission. No signal is transmitted in the GP, and the GP is used for switching from downlink transmission to uplink transmission, to avoid interference caused by a downlink signal to an uplink signal. The UpPTS is used for uplink transmission.

In a normal cyclic prefix (CP) configuration, the DwPTS, the GP, and the UpPTS include 14 symbols in total. In an extended CP configuration, the DwPTS, the GP, and the UpPTS include 12 symbols in total. Specifically, a quantity of symbols in the DwPTS, the GP, and the UpPTS is statically configured by the base station. The UpPTS may include a maximum of six symbols. For example, a possible configuration in a normal CP may be: DwPTS=3 symbols, GP=5 symbols, and UpPTS=6 symbols.

The following describes in detail scenarios in the embodiments of this application.

An FeMTC system and an eMTC system are used as examples. A BL terminal device or a CE terminal device exists in the FeMTC system and the eMTC system. Uplink bandwidth supported by the foregoing types of terminal devices may be less than system bandwidth. The system bandwidth may be considered as maximum total bandwidth that can be supported by a communications system. An SRS transmission resource is scheduled by a base station. Therefore, after the scheduling by the base station, a part (or all) of SRS transmission bandwidth may not be in transmission bandwidth supported by the terminal device, and therefore the terminal device needs to perform retuning. In one scenario, the terminal device performs retuning in different subframes. In another scenario, the terminal device performs retuning in a special subframe.

Scenario 1: A terminal device performs retuning in different subframes.

Figure 2A:
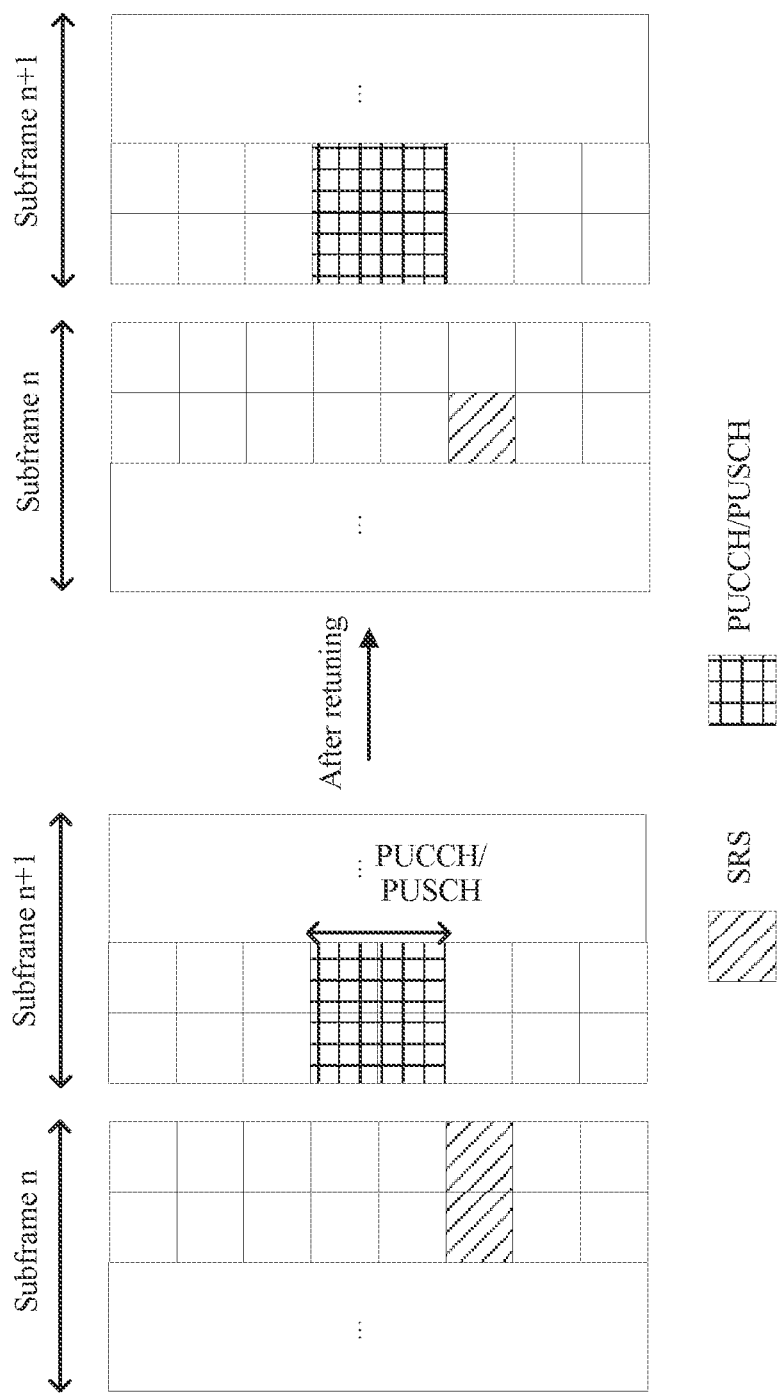
FIG. 2A is a schematic diagram of retuning corresponding to a scenario 1 according to an embodiment of this application.

As shown in FIG. 2A, a base station schedules a terminal device 1 to transmit an SRS in some frequency domain resources of the last two symbols in a subframe n, and schedules the terminal device 1 to transmit a physical uplink control channel (PUCCH) or a physical uplink shared channel (PUSCH) in the first two symbols in a subframe n+1. An uplink transmission frequency domain resource that can be supported by the terminal device 1 is a frequency domain resource used to transmit the PUCCH or the PUSCH.

It can be seen from FIG. 2A that, the frequency domain resources for transmitting the SRS exceed the frequency domain resource that can be supported by the terminal device 1. If a time period required for retuning by the terminal device is B=1 symbol (B indicates a quantity of symbols required for retuning by the terminal device), the terminal device needs to use one symbol as a guard period during retuning. The terminal device does not send data in the guard period. If a time period required for retuning is B=2 symbols, the terminal device needs to use two symbols as a guard period during retuning. Certainly, if 0 symbols are required for retuning by the terminal device, during retuning, the terminal device can successfully send all SRSs and PUCCHs or PUSCHs that need to be sent. For example, the time period required for retuning by the terminal device is one symbol. In an existing solution, an SRS is not preferentially sent in any case, and therefore a guard period is generated in a symbol used to send the SRS. As shown in FIG. 2A, an SRS that needs to be sent in the last symbol of the subframe n is not sent.

It should be noted that, in the scenario 1, the subframe n may be an uplink subframe or a special subframe. This is not specifically limited in the embodiments of this application. The subframe n+1 may be an uplink subframe or a special subframe. This is not specifically limited in the embodiments of this application.

Scenario 2: A terminal device performs retuning in a special subframe.

Figure 2B:
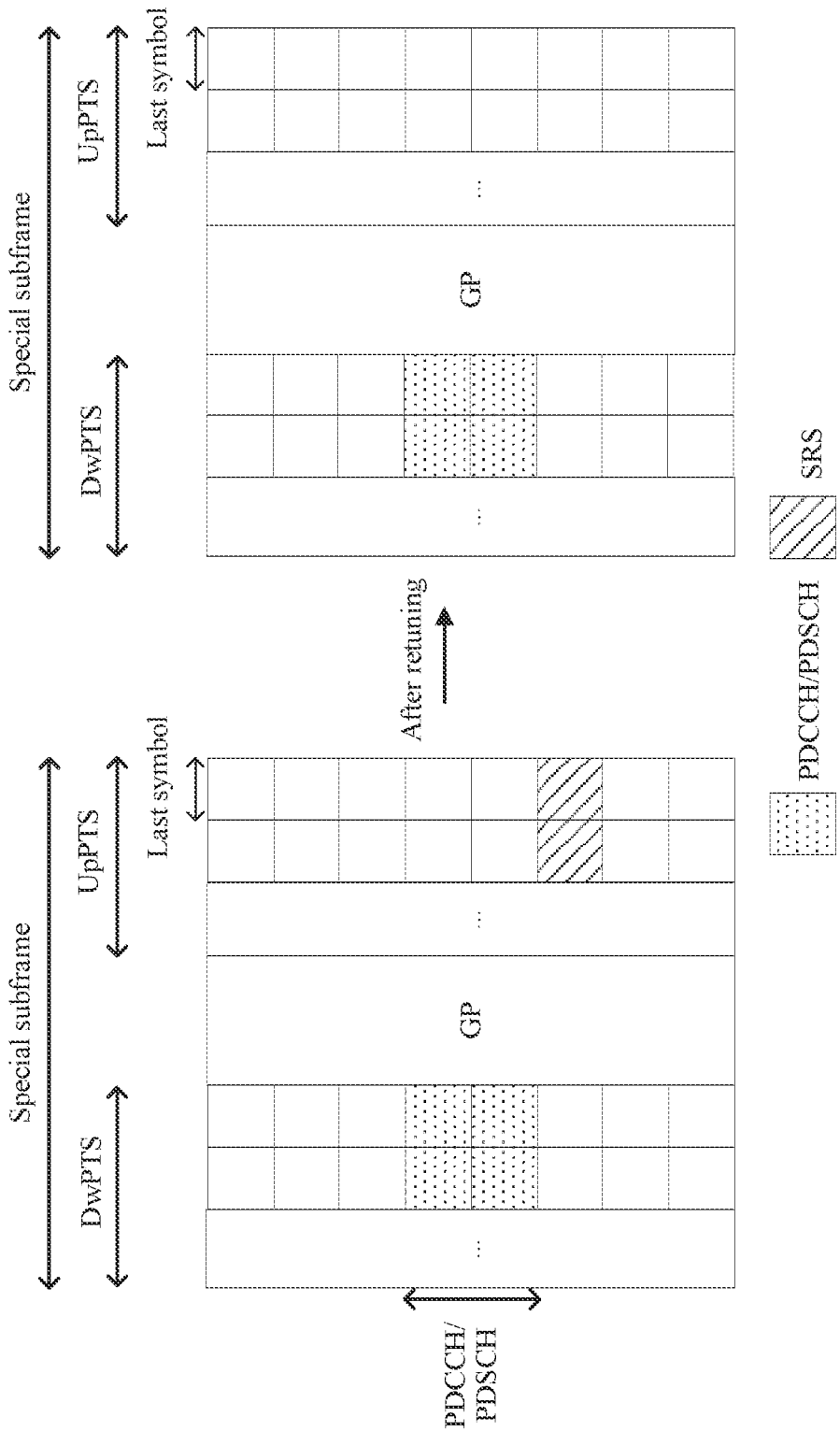
FIG. 2B is a schematic diagram of retuning corresponding to a scenario 2 according to an embodiment of this application.

An SRS may be transmitted in an UpPTS of the special subframe, and can be transmitted in a maximum of six symbols of the UpPTS. However, during scheduling by a base station, SRS transmission bandwidth of the terminal device in an UpPTS of a special subframe may exceed downlink transmission bandwidth of the terminal device in a DwPTS of the special subframe. As shown in FIG. 2B, a base station schedules a terminal device 1 to transmit an SRS in some frequency domain resources of the last two symbols in an UpPTS of a special subframe and to receive a PDCCH or receive a PDSCH in a DwPTS of the special subframe. The frequency domain resources used by the terminal device to send the SRS are completely or partly different from a frequency domain resource used by the terminal device to receive the PDCCH or the PDSCH, and therefore a transmission frequency band of the SRS is not in a downlink transmission frequency band of the terminal device 1. In this case, the terminal device needs to perform retuning, to change a frequency domain resource position in which the terminal device transmits a signal, so as to transmit symbols in different frequency bands. For example, a time period required for retuning by the terminal device is one symbol. In an existing solution, an SRS is not preferentially sent in any case, and therefore a guard period is generated in a symbol used to send the SRS. As shown in FIG. 2B, an SRS that needs to be transmitted by the terminal device in the UpPTS is not sent.

However, considering a performance requirement of a communications system, SRS coverage needs to be enhanced. Therefore, the SRS needs to be repeatedly sent in a plurality of symbols in time domain. If the terminal device does not preferentially transmit the SRS during retuning, an SRS coverage enhancement requirement of the communications system cannot be met.

Based on this, the embodiments of this application provide a retuning method and apparatus. During retuning by a terminal device, transmission of another signal less important than an SRS is preferentially dropped, to meet an SRS coverage enhancement requirement of a communications system. The method and apparatus are based on a same inventive concept. Because a problem-resolving principle of the method is similar to that of the apparatus, mutual reference may be made between apparatus implementation and method implementation. No repeated description is provided.

The following describes in detail solutions provided in the embodiments of this application with reference to the accompanying drawings.

Figure 3:
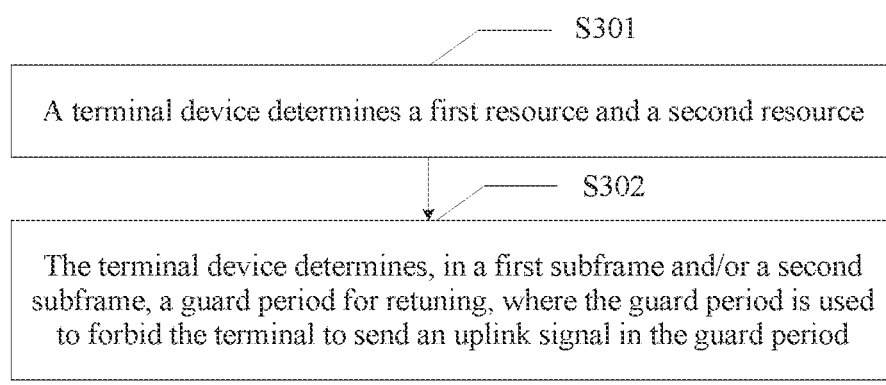
FIG. 3 is a flowchart of a retuning method in a scenario 1 according to an embodiment of this application.

Based on the scenario 1, an embodiment of this application provides a retuning method. As shown in FIG. 3, the method includes the following steps.

S301. A terminal device determines a first resource and a second resource.

The first resource is used to send a sounding reference signal. The first resource is determined based on a first frequency domain resource and at least one symbol of a first subframe. The at least one symbol includes the last symbol of the first subframe. The second resource is used to send a physical uplink shared channel or a physical uplink control channel. The second resource is determined based on a second frequency domain resource and a second subframe. The first subframe is the first subframe in two consecutive subframes. The second subframe is the second subframe in the two consecutive subframes.

It should be noted that all or a part of the first frequency domain resource is not in the second frequency domain resource, or the first frequency domain resource does not fully overlap with the second frequency domain resource.

That the first frequency domain resource does not fully overlap with the second frequency domain resource means that no overlapping part exists between a subcarrier range within which the first frequency domain resource falls and a subcarrier range within which the second frequency domain resource falls, or both an overlapping part and a non-overlapping part exist between a subcarrier range within which the first frequency domain resource falls and a subcarrier range within which the second frequency domain resource falls.

S302. The terminal device determines, in the first subframe and/or the second subframe, a guard period for retuning, where the guard period is used to forbid the terminal device to send an uplink signal in the guard period.

Optionally, the terminal device determines, in the first subframe and/or the second subframe based on a retuning capability of the terminal device, the guard period for retuning. The retuning capability of the terminal device may be specifically a quantity of symbols required for retuning by the terminal device.

In this embodiment of this application, bandwidth of the first frequency domain resource is equal to transmission bandwidth of the sounding reference signal, and the second frequency domain resource may be a narrowband resource. Bandwidth of the narrowband resource is equal to maximum bandwidth that can be supported by the terminal device, or bandwidth of the narrowband resource is equal to a maximum quantity of physical resource blocks that can be supported by the terminal device.

The narrowband resource is described with respect to system bandwidth. When UE capabilities are limited, for example, costs are limited and power consumption is limited, the second frequency domain resource may be the narrowband resource. Supporting larger bandwidth requires higher costs and higher power consumption. Therefore, using the narrowband resource can effectively reduce costs and total power consumption, improve transmit power in a unit frequency band to extend an uplink coverage area, and so on.

In a possible implementation, the terminal device determines, at least in the second subframe, the guard period for retuning. In the prior art, when a guard period is required for retuning, SRS sending is preferentially dropped. The last one or more symbols in symbols of the first subframe that are used to send the SRS are usually used as the guard period. In other words, the SRS and other uplink signals are forbidden to be sent in the last one or more symbols of the first subframe. According to the solution provided in this embodiment of this application, the SRS is preferentially reserved instead of being preferentially dropped, and the first one or more symbols of the second subframe are preferentially dropped and used as the guard period.

Optionally, when one symbol needs to be used as the guard period for retuning by the terminal device, in step S302, that the terminal device determines, in the first subframe and/or the second subframe, a guard period for retuning may be specifically implemented in the following manner:

The terminal device determines that the guard period is in the first symbol in a plurality of symbols in the second subframe that are used to send the PUSCH or the PUCCH.

It should be noted that if the PUCCH or the PUSCH is sent in the second subframe, the sending usually starts from the first symbol of the second subframe.

Specifically, the terminal device determines, based on the retuning capability of the terminal device, that one symbol is required for retuning, and therefore the terminal device uses the first symbol of the second subframe as the guard period for retuning. In other words, the terminal device is forbidden to send an uplink signal in the first symbol of the second subframe.

Figure 4:
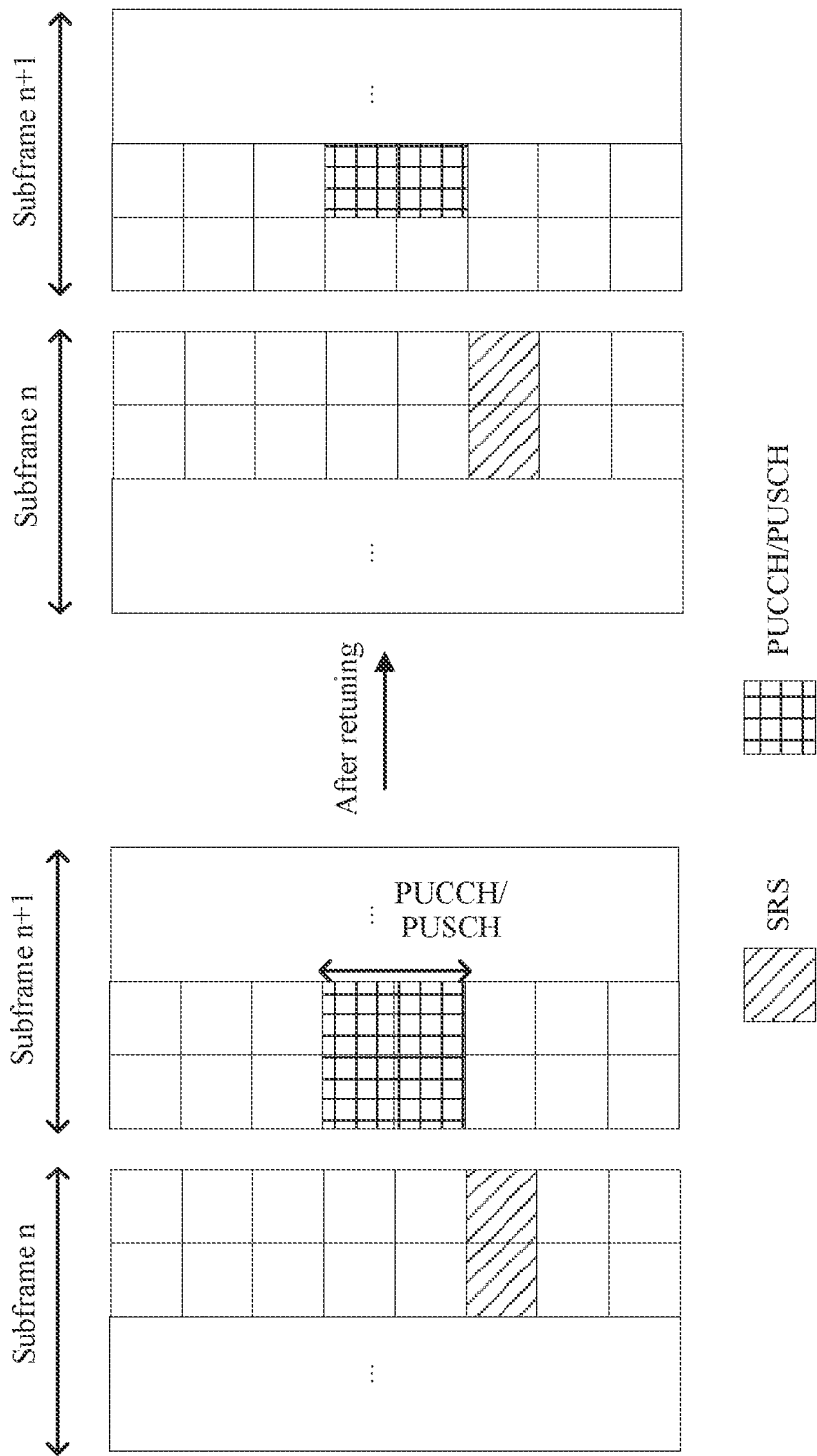
FIG. 4 is a schematic diagram of retuning when B=1 in a scenario 1 according to an embodiment of this application.

For example, as shown in FIG. 2A, the first subframe is the subframe n in FIG. 2A, and the second subframe is the subframe n+1 in FIG. 2A. In the foregoing manner, one symbol needs to be used as the guard period for retuning by the terminal device, and therefore the terminal device uses the first symbol of the subframe n+1 as the guard period used to forbid the terminal device to send an uplink signal in the first symbol of the subframe n+1. For details after adjustment, refer to FIG. 4.

Optionally, when two symbols need to be used as the guard period for retuning by the terminal device, in step S302, that the terminal device determines, in the first subframe and/or the second subframe, a guard period for retuning may be specifically implemented in the following manner:

If the second resource is used to send the PUCCH, the terminal device determines that the guard period is in the last symbol of the first subframe and the first symbol in a plurality of symbols in the second subframe that are used to send the PUCCH.

Figure 5A:
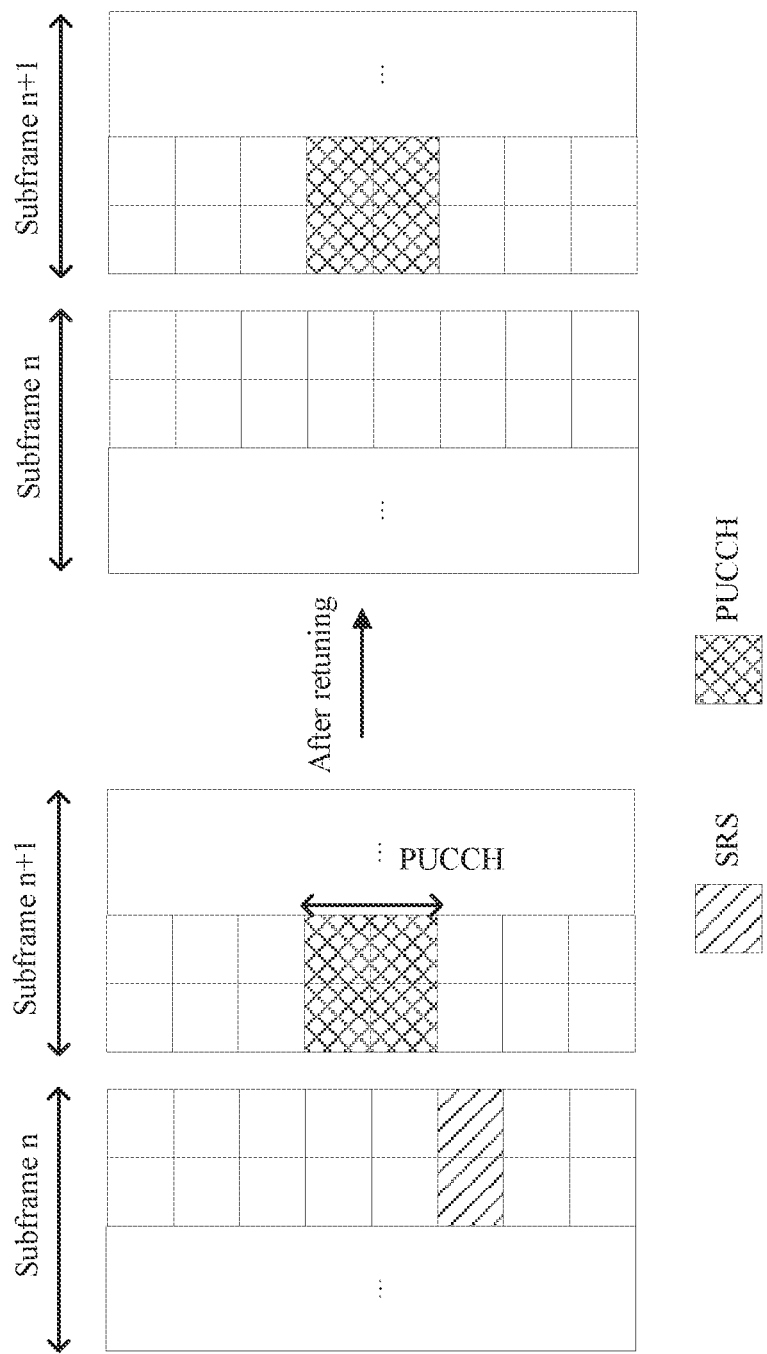
FIG. 5A and FIG. 5B are schematic diagrams of retuning when B=2 in a scenario 1 according to an embodiment of this application.
Figure 5B:
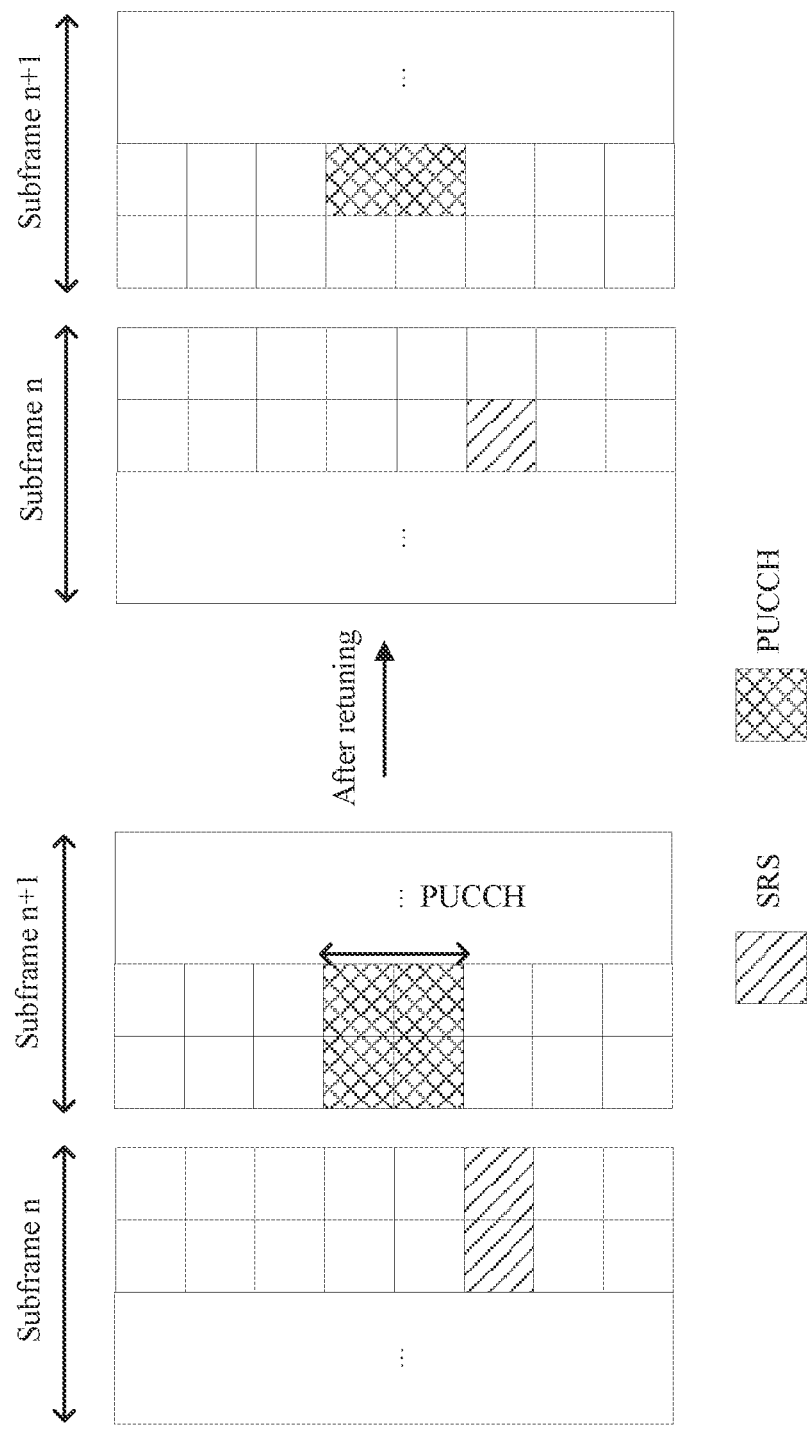

For example, as shown in FIG. 5A and FIG. 5B, the first subframe is a subframe n in FIG. 5A and FIG. 5B, and the second subframe is a subframe n+1 in FIG. 5A and FIG. 5B. The SRS is sent in the last two symbols of the subframe n. Because two symbols are required for retuning by the terminal device, according to a solution provided in the prior art, as shown in FIG. 5A, the terminal device sends no uplink signal in the last two symbols of the subframe n. In other words, the last two symbols of the subframe n are used as the guard period. According to the solution provided in this embodiment of this application, as shown in FIG. 5B, when the first two symbols of the subframe n+1 are used to send the PUCCH, in an SRS coverage enhancement scenario, SRS transmission needs to be reserved as far as possible; in addition, a signal carried in the PUCCH is a control signal, and the control signal is of relatively high importance, and therefore PUCCH signal transmission also needs to be reserved as far as possible. Therefore, transmission in one symbol selected from symbols used to transmit the SRS and transmission in one symbol selected from symbols used to transmit the PUCCH are dropped. Specifically, the terminal device uses the last symbol of the subframe n and the first symbol of the subframe n+1 as the guard period used to forbid the terminal device to send an uplink signal.

Optionally, when two symbols need to be used as the guard period for retuning by the terminal device, in step S302, that the terminal device determines, in the first subframe and/or the second subframe, a guard period for retuning may be specifically implemented in the following manner:

If the second resource is used to send the physical uplink shared channel, the terminal device determines that the guard period is in the first two symbols in a plurality of consecutive symbols in the second subframe that are used to send the PUSCH.

Figure 6A:
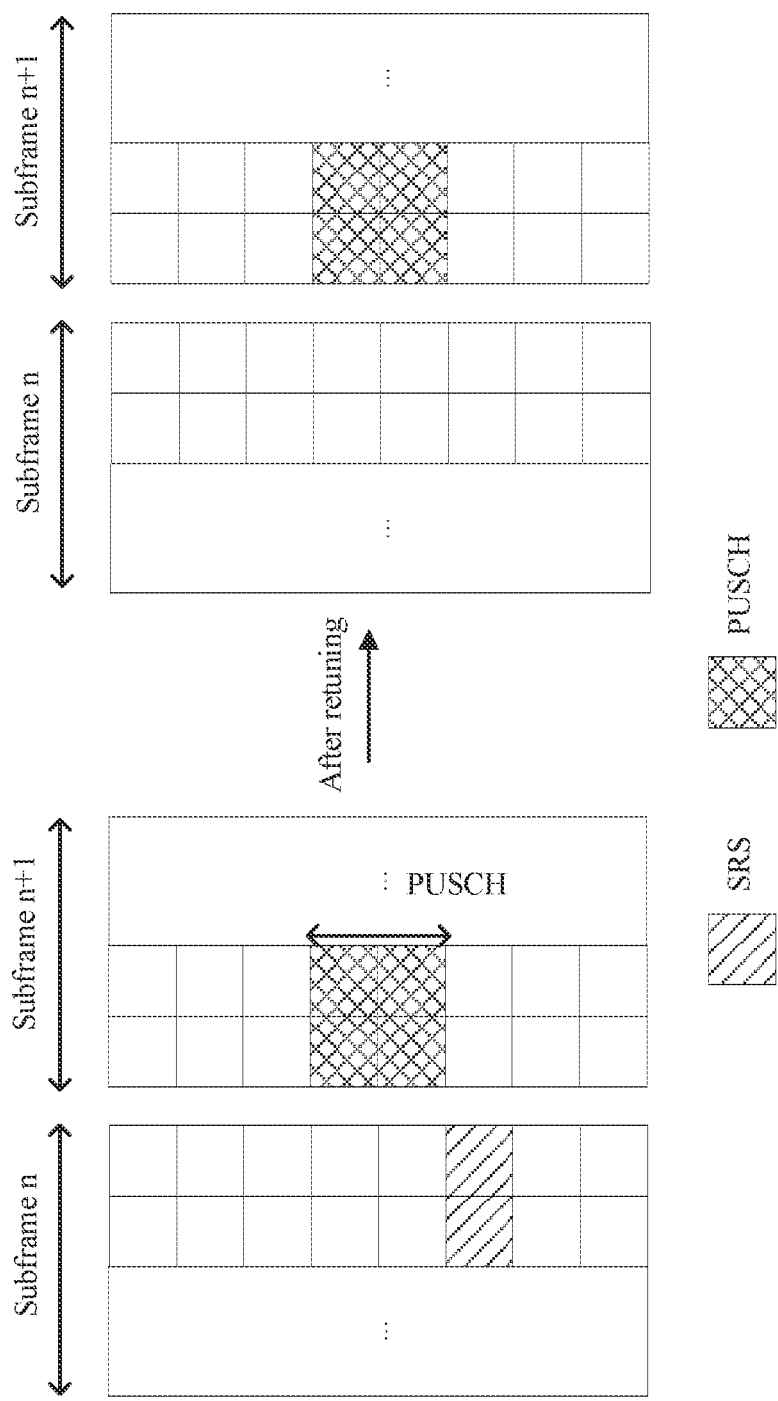
FIG. 6A and FIG. 6B are schematic diagrams of another type of retuning when B=2 in a scenario 1 according to an embodiment of this application.
Figure 6B:
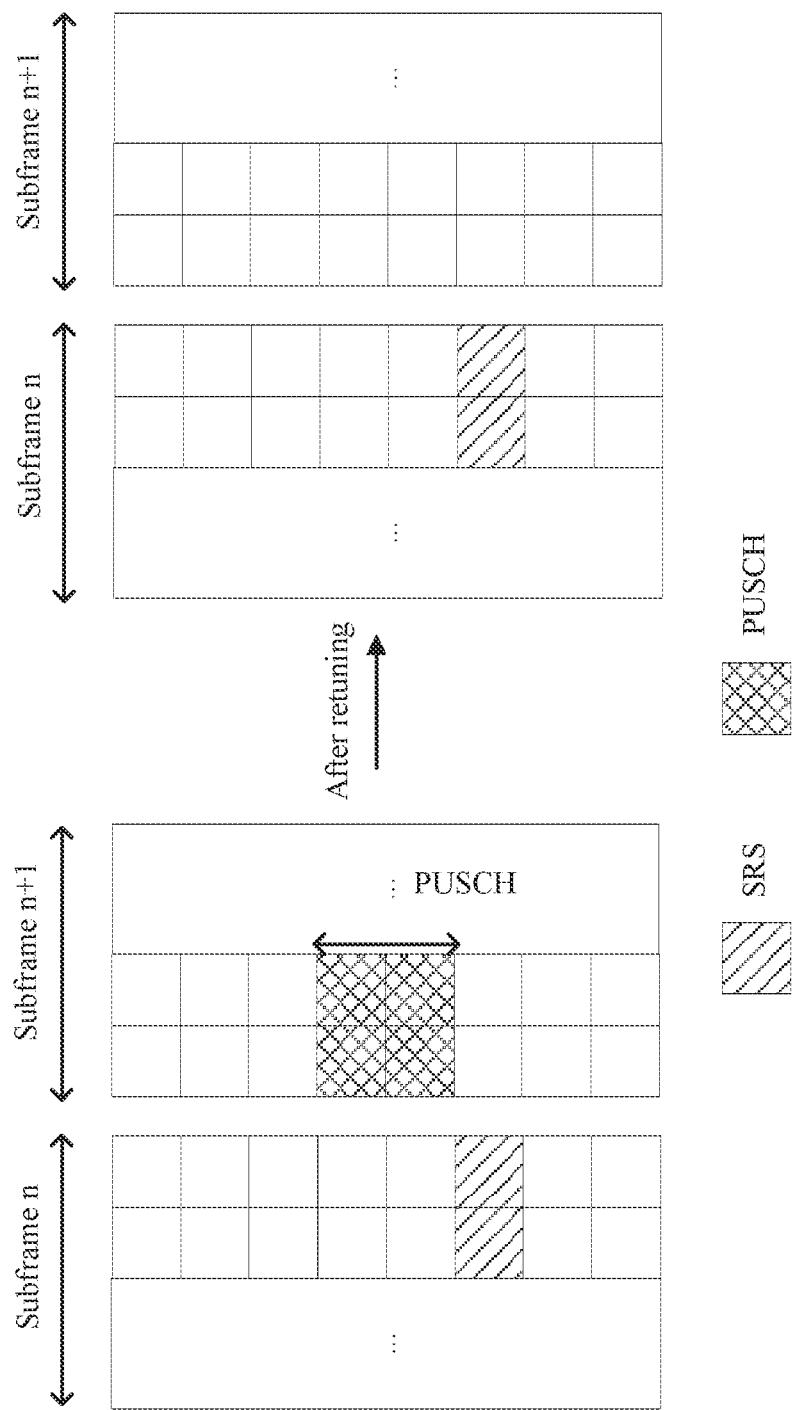

For example, as shown in FIG. 6A and FIG. 6B, the first subframe is a subframe n in FIGS. 6A and 6B, and the second subframe is a subframe n+1 in FIG. 6A and FIG. 6B. The SRS is sent in the last two symbols of the subframe n. Because two symbols are required for retuning by the terminal device, according to a solution provided in the prior art, as shown in FIG. 6A, the terminal device sends no uplink signal in the last two symbols of the subframe n. In other words, the last two symbols of the subframe n are used as the guard period. According to the solution provided in this embodiment of this application, as shown in FIG. 6B, when the first two symbols of the subframe n+1 are used to send the PUSCH, in an SRS coverage enhancement scenario, SRS transmission needs to be reserved as far as possible; in addition, a signal carried in the PUSCH is a data signal, and the data signal is of relatively low importance. Therefore, PUSCH transmission in the first two symbols is chosen to be dropped. Specifically, the terminal device uses the first two symbols of the subframe n+1 as the guard period used to forbid the terminal device to send an uplink signal.

Figure 7A:
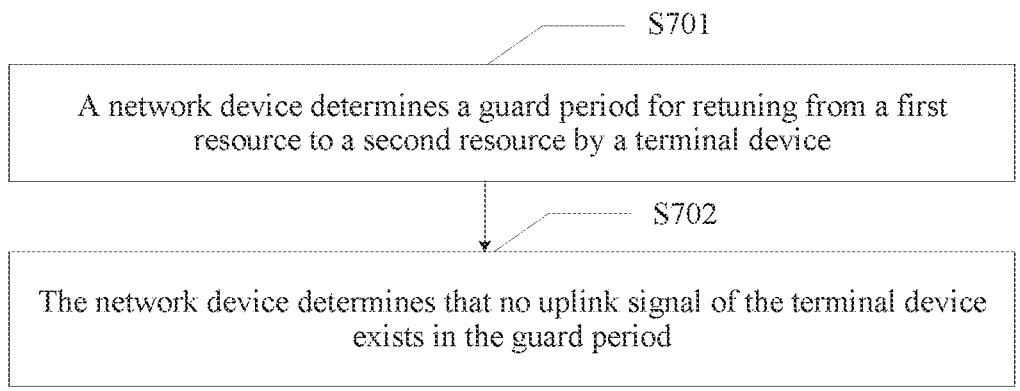
FIG. 7A is a flowchart of another type of retuning in a scenario 1 according to an embodiment of this application.

In the scenario 1, as shown in FIG. 7A, a network device determines a guard period required for retuning by a terminal device, and determines that no uplink signal of the terminal device exists in the guard period. Specifically:

S701. The network device determines the guard period for retuning from the first resource to the second resource by the terminal device.

For descriptions of the first resource, the second resource, and the guard period, refer to the descriptions in the embodiment shown in FIG. 3. Details are not described herein again in this embodiment of this application.

S702. The network device determines that no uplink signal of the terminal device exists in the guard period.

In a possible design, before the terminal device determines, in the first subframe and/or the second subframe, the guard period for retuning in step S302, the method may further include:

receiving, by the terminal device, first indication information sent by the network device, where the first indication information is used to instruct the terminal device to determine the guard period in the first subframe and/or the second subframe.

Figure 7B:
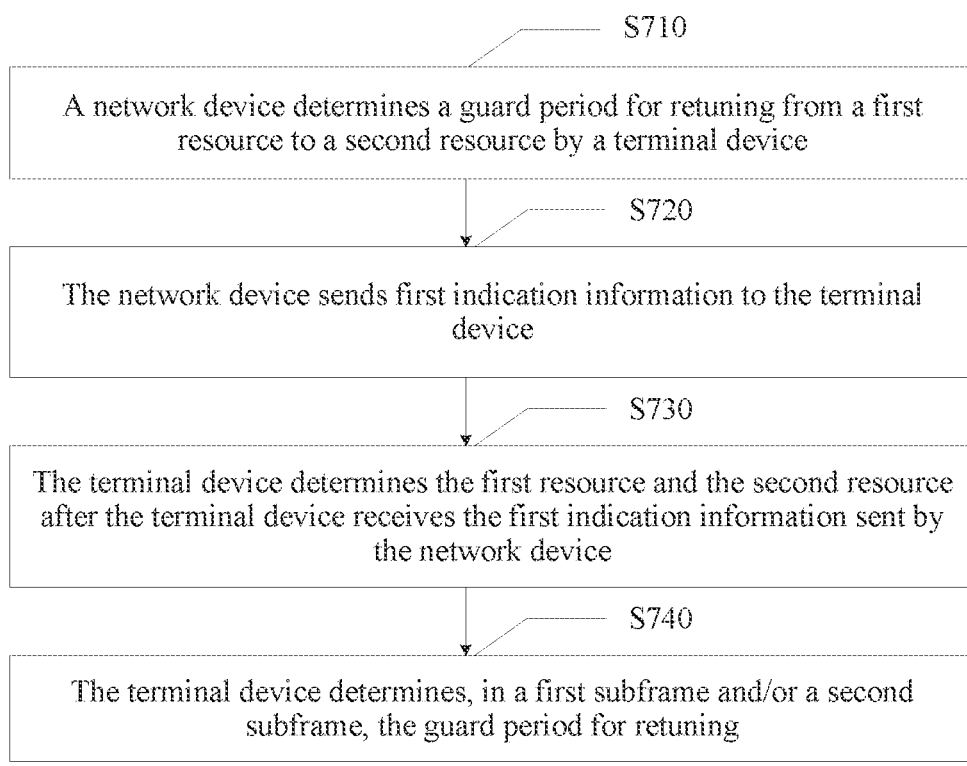
FIG. 7B is a flowchart of still another type of retuning in a scenario 1 according to an embodiment of this application.

Specifically, the network device may send the first indication information to the terminal device after determining the guard period for retuning from the first resource to the second resource by the terminal device in step S701. For details, refer to FIG. 7B.

S710. The network device determines the guard period for retuning from the first resource to the second resource by the terminal device.

S720. The network device sends the first indication information to the terminal device.

S730. The terminal device determines the first resource and the second resource after the terminal device receives the first indication information sent by the network device.

S740. The terminal device determines, in the first subframe and/or the second subframe, the guard period for retuning.

The first indication information is used to instruct the terminal device to determine the guard period by using the solution provided in this application, that is, determine the guard period in a manner of preferentially reserving SRS transmission.

Optionally, when the network device sends the first indication information to the terminal device, specifically, the network device may add the first indication information to radio resource control (RRC) signaling, and send the signaling to the terminal device; or when sending downlink control information (DCI) to the terminal device, the network device may add the first indication information to the DCI, and send the DCI to the terminal device.

Specifically, the first indication information is used to indicate that the guard period is in the first symbol in a plurality of consecutive symbols in the second subframe that are used to send the physical uplink shared channel or the physical uplink control channel.

Alternatively, the first indication information is used to indicate that the guard period is in the last symbol of the first subframe and the first symbol in a plurality of symbols in the second subframe that are used by the terminal device to send the physical uplink control channel.

Alternatively, the first indication information is used to indicate that the guard period is in the first two symbols in a plurality of symbols in the second subframe that are used by the terminal device to send the physical uplink shared channel.

Optionally, the network device may send second indication information to the terminal device. The second indication information is used to instruct the terminal device to determine the guard period by using a solution provided in the prior art, that is, determine the guard period in a manner of preferentially dropping SRS transmission. In this case, after receiving the second indication information, the terminal device determines the guard period in the manner of preferentially dropping SRS transmission.

Specifically, the second indication information may be used to indicate that the guard period is in the last symbol of the first subframe; or if the sounding reference signal is sent only in the last symbol of the first subframe, the second indication information is used to indicate that the guard period is in the last symbol of the first subframe and the first symbol of the second subframe; or if the sounding reference signal is sent only in at least two symbols of the first subframe, and the at least two symbols include the last symbol of the first subframe, the second indication information is used to indicate that the guard period is in a plurality of consecutive symbols from the first symbol to the last symbol in the at least two symbols of the first subframe.

A minimum size of a field (indication bit) occupied by the first indication information or the second indication information may be one bit. For example, the indication bit may be referred to as a flag. Flag=1 indicates the first indication information used to instruct to determine the guard period in the manner of preferentially reserving the SRS transmission. Flag=0 indicates the second indication information used to instruct to determine the guard period in the manner of preferentially dropping SRS transmission. Alternatively, flag=1 may indicate the second indication information, and flag=0 may indicate the first indication information. This is not specifically limited in this embodiment of this application. In addition, the size of the field occupied by the indication information and a flag of the indication bit are not specifically limited in this embodiment of this application.

Figure 8:
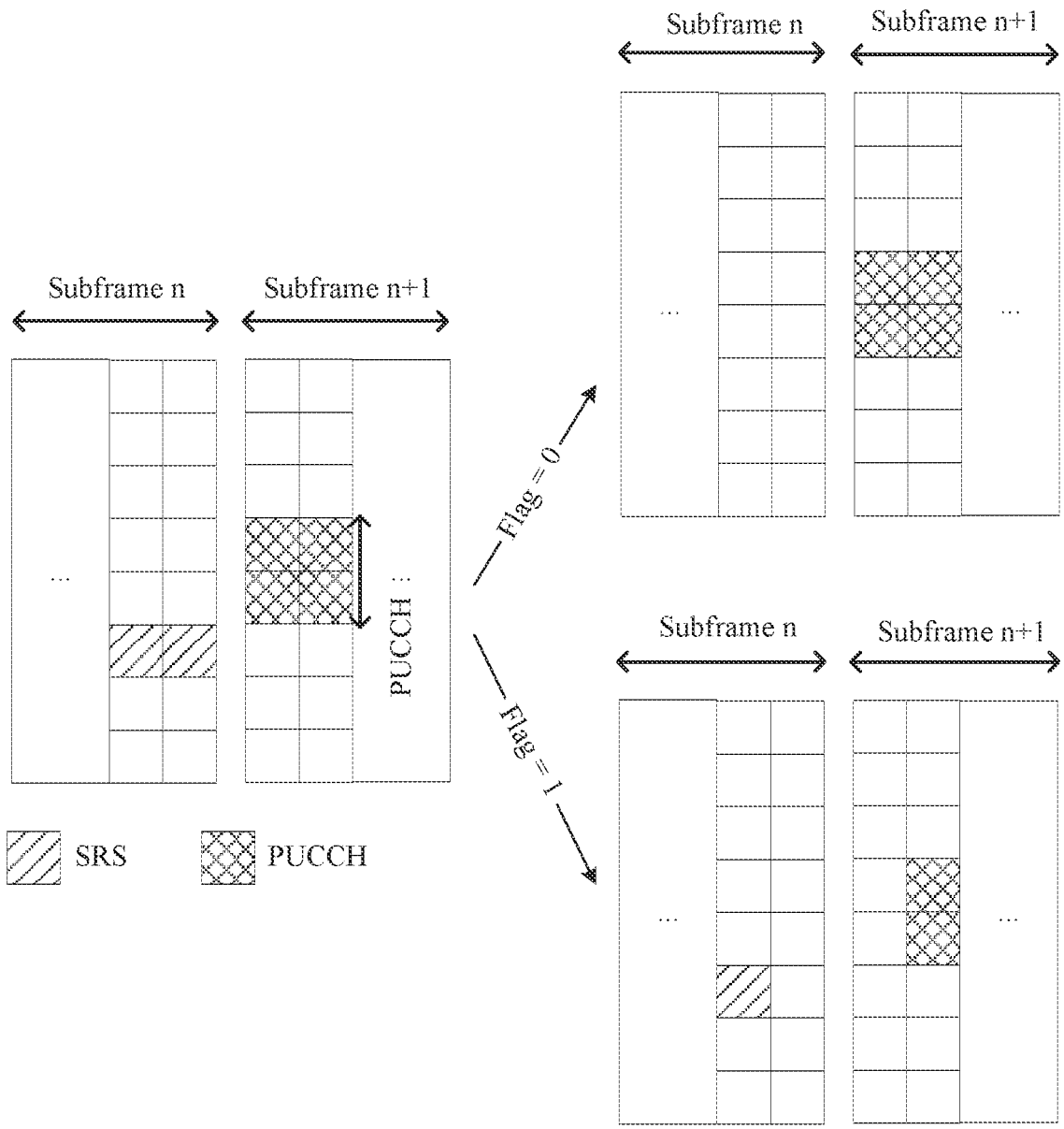
FIG. 8 is a schematic diagram of retuning based on indication information in a scenario 1 according to an embodiment of this application.

For example, two symbols are required for retuning by the terminal device, and the PUCCH is sent in the second subframe. The terminal device sends at least two SRSs in the first subframe. As shown in FIG. 8, flag=1 indicates the first indication information used to instruct to determine the guard period in the manner of preferentially reserving the SRS transmission. Flag=0 indicates the second indication information used to instruct to determine the guard period in the manner of preferentially dropping SRS transmission. In FIG. 8, a subframe n indicates the first subframe, and a subframe n+1 indicates the second subframe. The SRS is sent in the last two symbols of the subframe n. Because two symbols are required for retuning by the terminal device, when flag=0, the terminal device sends no uplink signal in the last two symbols of the subframe n. In other words, the last two symbols of the subframe n are used as the guard period. When flag=1, transmission in one symbol selected from symbols used to transmit the SRS and transmission in one symbol selected from symbols used to transmit the PUCCH are dropped. Specifically, the terminal device uses the last symbol of the subframe n and the first symbol of the subframe n+1 as the guard period used to forbid the terminal device to send an uplink signal.

In the foregoing implementation, the indication information is carried in higher layer signaling to indicate a manner in which the terminal device performs retuning, so that a symbol in which transmission needs to be reserved by the terminal device during retuning and a symbol in which transmission needs to be dropped by the terminal device during retuning are flexibly selected. This improves flexibility.

Figure 9:
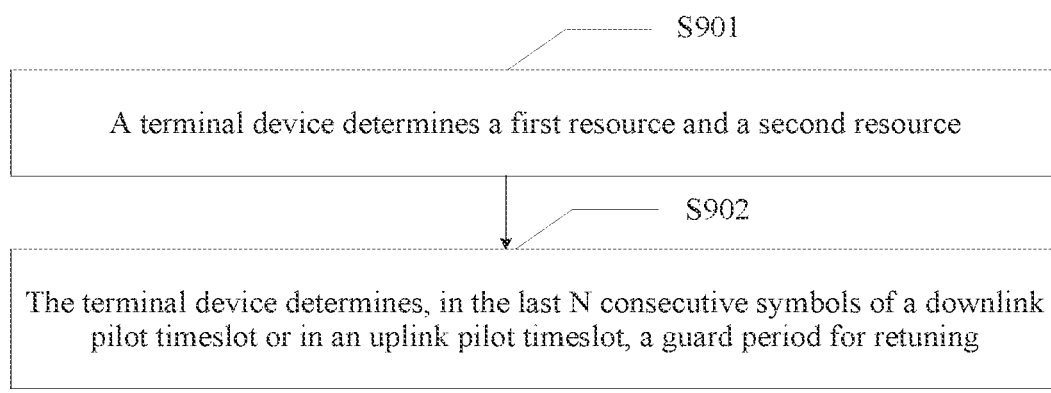
FIG. 9 is a flowchart of a retuning method in a scenario 2 according to an embodiment of this application.

Based on the scenario 2, an embodiment of this application provides a retuning method. As shown in FIG. 9, the method includes the following steps.

S901. A terminal device determines a first resource and a second resource.

The first resource is used to receive a physical downlink control channel or a physical downlink shared channel. The first resource is determined based on a first frequency domain resource and M consecutive symbols of a downlink pilot timeslot in a special subframe. The second resource is used to send a sounding reference signal. The second resource is determined based on a second frequency domain resource and an uplink pilot timeslot in the special subframe. All or a part of the second frequency domain resource is not in the first frequency domain resource.

It should be noted that all or a part of the first frequency domain resource is not in the second frequency domain resource, or the first frequency domain resource does not fully overlap with the second frequency domain resource.

That the first frequency domain resource does not fully overlap with the second frequency domain resource means that no overlapping part exists between a subcarrier range within which the first frequency domain resource falls and a subcarrier range within which the second frequency domain resource falls, or both an overlapping part and a non-overlapping part exist between a subcarrier range within which the first frequency domain resource falls and a subcarrier range within which the second frequency domain resource falls.

S902. The terminal device determines, in the last N consecutive symbols of the downlink pilot timeslot or in the uplink pilot timeslot, a guard period for retuning.

The guard period is used to forbid the terminal device to receive/transmit a signal in the guard period. Both M and N are positive integers, and M is greater than or equal to N.

Optionally, the terminal device determines, in the last N consecutive symbols of the downlink pilot timeslot or in the uplink pilot timeslot based on a retuning capability of the terminal device, the guard period for retuning. The retuning capability of the terminal device may be specifically a quantity of symbols required for retuning by the terminal device.

In this embodiment of this application, bandwidth of the first frequency domain resource is equal to transmission bandwidth of the sounding reference signal, and the second frequency domain resource may be a narrowband resource. Bandwidth of the narrowband resource is equal to maximum bandwidth that can be supported by the terminal device, or bandwidth of the narrowband resource is equal to a maximum quantity of physical resource blocks that can be supported by the terminal device.

The narrowband resource is described with respect to system bandwidth. When UE capabilities are limited, for example, costs are limited and power consumption is limited, the second frequency domain resource may be the narrowband resource. Supporting larger bandwidth requires higher costs and higher power consumption. Therefore, using the narrowband resource can effectively reduce costs and total power consumption, improve transmit power in a unit frequency band to extend an uplink coverage area, and so on.

Figure 10:
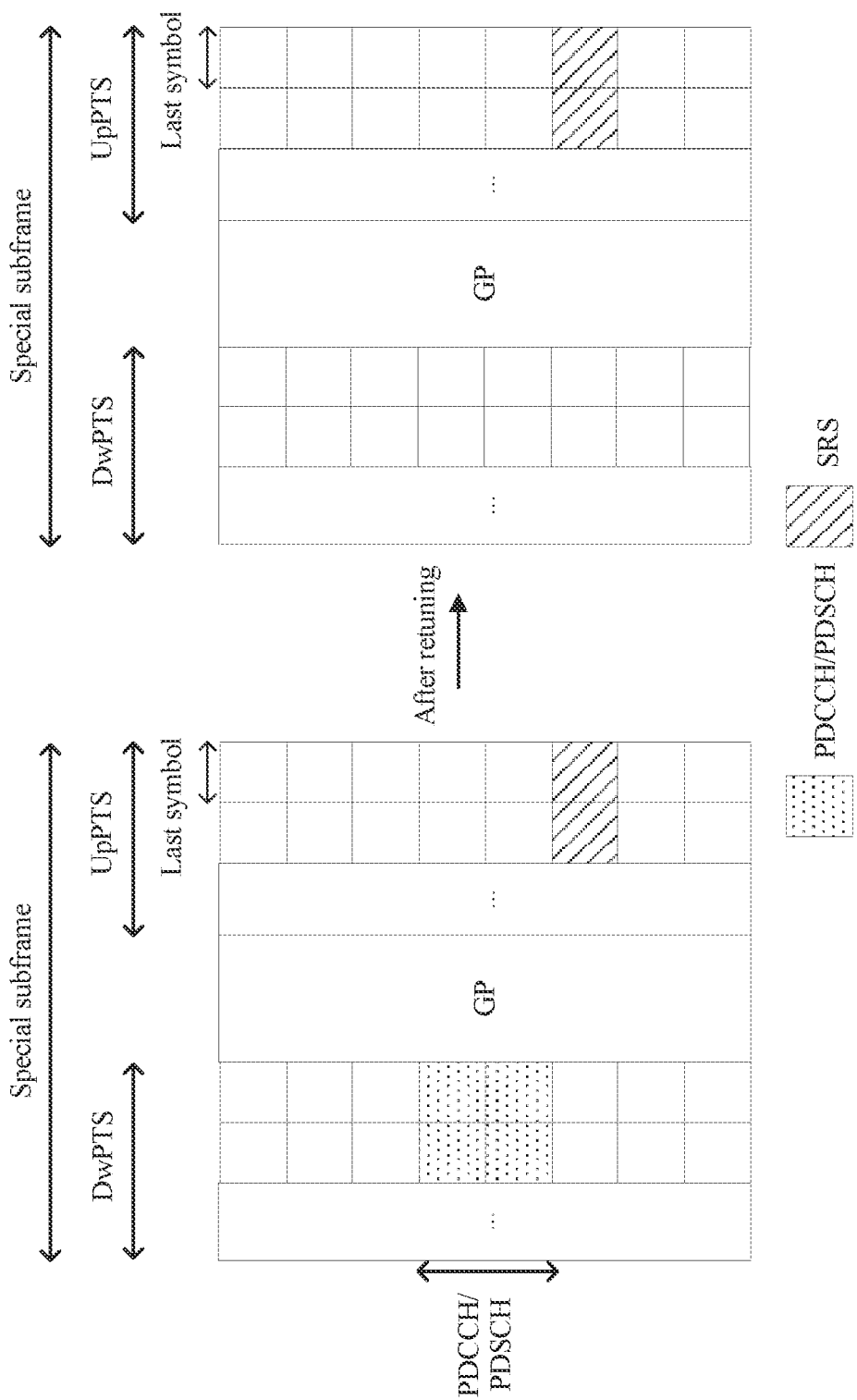
FIG. 10 is a schematic diagram of retuning in a scenario 2 according to an embodiment of this application.

For example, if two symbols are required for retuning by the terminal device, when the terminal device determines, in the last N consecutive symbols of the downlink pilot timeslot, the guard period for retuning, the terminal device determines that the last two symbols of the downlink pilot timeslot are the guard period for retuning. As shown in FIG. 10, a signal that needs to be received by the terminal device in the DwPTS is the PDCCH or the PDSCH, and the terminal device transmits the SRS in the last two symbols of the UpPTS. Therefore, the terminal device does not receive the PUCCH or the PUSCH in the last two symbols of the DwPTS, uses the last two symbols of the DwPTS as the guard period, and normally transmits the SRS in the last two symbols of the UpPTS, to ensure SRS coverage enhancement.

Figure 11A:
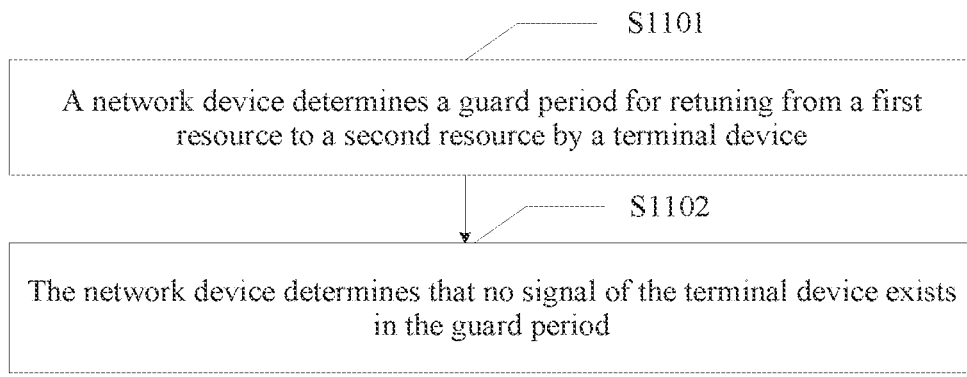
FIG. 11A and FIG. 11B are flowcharts of retuning methods in a scenario 2 according to an embodiment of this application.

In the scenario 2, as shown in FIG. 11A, a network device determines a guard period required for retuning by a terminal device, and determines that no signal of the terminal device exists in the guard period. Specifically.

S1101. The network device determines the guard period for retuning from the first resource to the second resource by the terminal device.

For descriptions of the first resource, the second resource, and the guard period, refer to the descriptions in the embodiment shown in FIG. 9. Details are not described herein again in this embodiment of this application.

S1102. The network device determines that no signal of the terminal device exists in the guard period.

In a possible design, before the terminal device determines, in the last N consecutive symbols of the downlink pilot timeslot, the guard period for retuning in step S902, the method may further include:

sending, by the network device, first indication information to the terminal device, where the first indication information is used to instruct the terminal device to determine the guard period in the last N consecutive symbols of the downlink pilot timeslot.

Then, the terminal device receives the first indication information sent by the network device, and determines the guard period based on the first indication information.

Figure 11B:
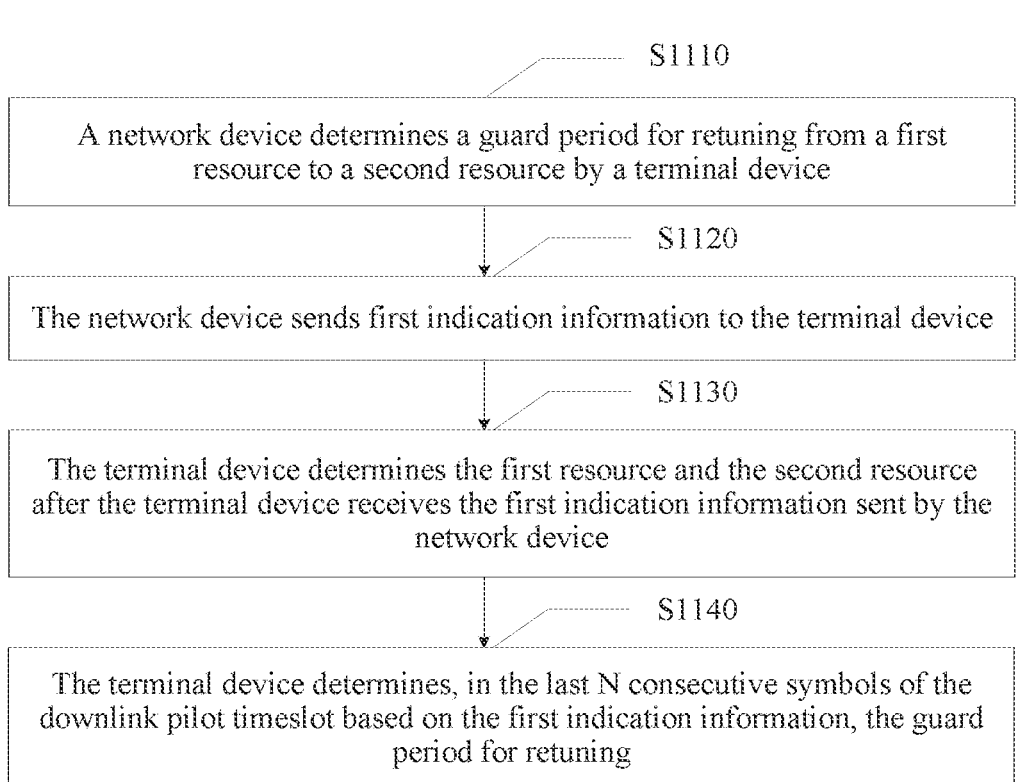

Specifically, the network device may send the first indication information to the terminal device after determining the guard period for retuning from the first resource to the second resource by the terminal device in step S1101. For details, refer to FIG. 11B.

S1110. The network device determines the guard period for retuning from the first resource to the second resource by the terminal device.

S1120. The network device sends the first indication information to the terminal device.

S1130. The terminal device determines the first resource and the second resource after the terminal device receives the first indication information sent by the network device.

S1140. The terminal device determines, in the last N consecutive symbols of the downlink pilot timeslot based on the first indication information, the guard period for retuning.

The first indication information is used to instruct the terminal device to determine the guard period by using the solution provided in this application, that is, determine the guard period in a manner of reserving SRS transmission.

Optionally, when the network device sends the first indication information to the terminal device, specifically, the network device may add the first indication information to RRC signaling, and send the signaling to the terminal device; or when sending DCI to the terminal device, the network device may add the first indication information to the DCI, and send the DCI to the terminal device.

Optionally, the network device may send second indication information to the terminal device. The second indication information is used to instruct the terminal device to determine the guard period by using a solution provided in the prior art, that is, determine the guard period in a manner of dropping SRS transmission. In this case, after receiving the second indication information, the terminal device determines the guard period in the manner of dropping SRS transmission.

Specifically, before the terminal device determines, in the uplink pilot timeslot, the guard period for retuning, the network device sends the second indication information to the terminal device. Then, the terminal device receives the second indication information. The second indication information is used to indicate that the guard period is in the uplink pilot timeslot.

If the sounding reference signal is sent only in one symbol of the uplink pilot timeslot, the second indication information is used to indicate that the guard period is in the symbol of the uplink pilot timeslot.

Alternatively, if the sounding reference signal is sent in at least two symbols of the uplink pilot timeslot, the second indication information is used to indicate that the guard period is in a plurality of consecutive signals from the first symbol to the last symbol in the at least two symbols of the uplink pilot timeslot.

A minimum size of a field (indication bit) occupied by the first indication information or the second indication information may be one bit. For example, the indication bit may be referred to as a flag. Flag=1 indicates the first indication information used to instruct to determine the guard period in the manner of preferentially reserving the SRS transmission. Flag=0 indicates the second indication information used to instruct to determine the guard period in the manner of preferentially dropping SRS transmission. Alternatively, flag=1 may indicate the second indication information, and flag=0 may indicate the first indication information. This is not specifically limited in this embodiment of this application. In addition, the size of the field occupied by the indication information and a flag of the indication bit are not specifically limited in this embodiment of this application.

Figure 12:
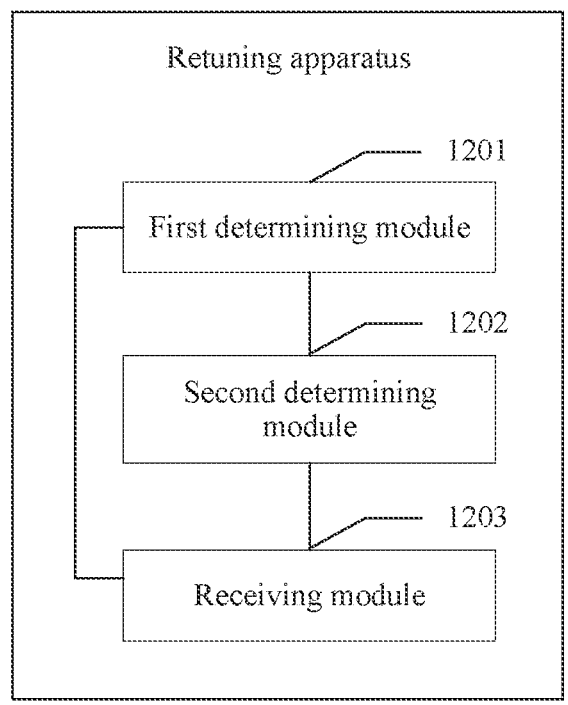
FIG. 12 is a schematic diagram of a retuning apparatus applied to a terminal device in a scenario 1 according to an embodiment of this application.

Based on a same inventive concept as the embodiment corresponding to the method provided in the scenario 1, an embodiment of this application further provides a retuning apparatus. The apparatus is applied to a terminal device. As shown in FIG. 12, the apparatus includes:

a first determining module 1201, configured to determine a first resource and a second resource, where the first resource is used to send a sounding reference signal, the first resource is determined based on a first frequency domain resource and at least one symbol of a first subframe, and the at least one symbol includes the last symbol of the first subframe; the second resource is used to send a physical uplink shared channel or a physical uplink control channel, the second resource is determined based on a second frequency domain resource and a second subframe, and all or a part of the first frequency domain resource is not in the second frequency domain resource; and the first subframe is the first subframe in two consecutive subframes, and the second subframe is the second subframe in the two consecutive subframes; and a second determining module 1202, configured to determine, in the first subframe and/or the second subframe, a guard period for retuning, where the guard period is used to forbid the terminal device to send an uplink signal in the guard period.

In a possible design, the second determining module 1202 is specifically configured to determine that the guard period is in the first symbol in a plurality of symbols in the second subframe that are used to send the physical uplink shared channel or the physical uplink control channel.

In a possible design, if the second resource is used to send the physical uplink control channel, the second determining module 1202 is specifically configured to determine that the guard period is in the last symbol of the first subframe and the first symbol in a plurality of symbols in the second subframe that are used to send the physical uplink control channel.

In a possible design, if the second resource is used to send the physical uplink shared channel, the second determining module 1202 is specifically configured to determine that the guard period is in the first two symbols in a plurality of consecutive symbols in the second subframe that are used to send the physical uplink shared channel.

In a possible design, the apparatus further includes:

a receiving module 1203, configured to receive first indication information before the second determining module 1202 determines, in the first subframe and/or the second subframe, the guard period for retuning, where the first indication information is used to instruct the terminal device to determine the guard period in the first subframe and/or the second subframe.

In a possible design, the receiving module 1203 is specifically configured to:

receive radio resource control signaling, where the radio resource control signaling carries the first indication information; or receive downlink control information, where the downlink control information includes the first indication information.

In a possible design, the apparatus further includes:

a receiving module 1203, configured to receive second indication information before the second determining module 1202 determines the guard period in the first subframe and/or the second subframe.

The second indication information is used to indicate that the guard period is in the last symbol of the first subframe; or if the sounding reference signal is sent only in the last symbol of the first subframe, the second indication information is used to indicate that the guard period is in the last symbol of the first subframe and the first symbol of the second subframe; or if the sounding reference signal is sent only in at least two symbols of the first subframe, and the at least two symbols include the last symbol of the first subframe, the second indication information is used to indicate that the guard period is in a plurality of consecutive symbols from the first symbol to the last symbol in the at least two symbols of the first subframe.

In a possible design, the receiving module 1203 is specifically configured to:

receive radio resource control signaling, where the radio resource control signaling carries the second indication information; or receive downlink control information, where the downlink control information includes the second indication information.

In a possible design, bandwidth of the first frequency domain resource is equal to transmission bandwidth of the sounding reference signal, and the second frequency domain resource is a narrowband resource.

In a possible design, bandwidth of the narrowband resource is equal to maximum bandwidth that can be supported by the terminal device, or bandwidth of the narrowband resource is equal to a maximum quantity of physical resource blocks that can be supported by the terminal device.

In a possible design, the terminal device is a bandwidth-reduced low-complexity (BL) terminal, a coverage enhanced (CE) terminal, or a machine type communication (MTC) terminal.

Figure 13:
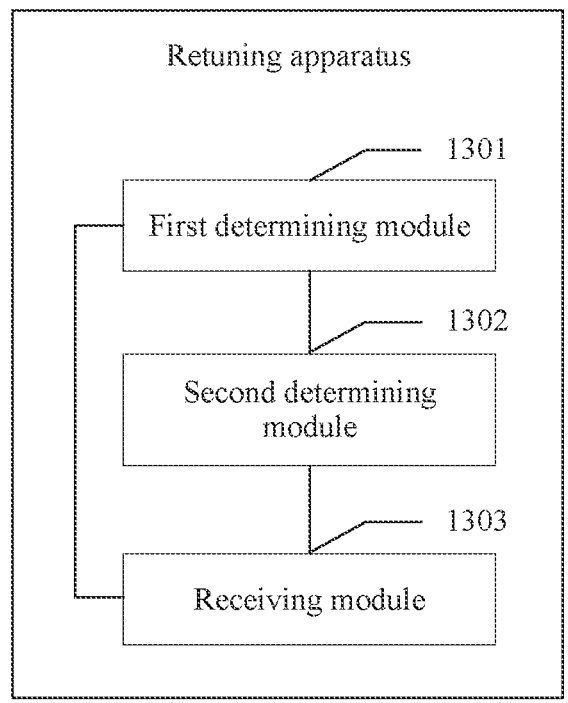
FIG. 13 is a schematic diagram of a retuning apparatus applied to a terminal device in a scenario 2 according to an embodiment of this application.

Based on a same inventive concept as the embodiment corresponding to the method provided in the scenario 2, an embodiment of this application further provides a retuning apparatus. The apparatus is applied to a terminal device. As shown in FIG. 13, the apparatus includes:

a first determining module 1301, configured to determine a first resource and a second resource, where the first resource is used to receive a physical downlink control channel or a physical downlink shared channel, and the first resource is determined based on a first frequency domain resource and M consecutive symbols of a downlink pilot timeslot in a special subframe; and the second resource is used to send a sounding reference signal, the second resource is determined based on a second frequency domain resource and an uplink pilot timeslot in the special subframe, and all or a part of the second frequency domain resource is not in the first frequency domain resource; and a second determining module 1302, configured to determine, in the last N consecutive symbols of the downlink pilot timeslot or in the uplink pilot timeslot, a guard period for retuning, where the guard period is used to forbid the terminal device to transmit/receive a signal in the guard period, both M and N are positive integers, and M is greater than or equal to N.

In a possible design, the apparatus further includes:

a receiving module 1303, configured to receive first indication information before the second determining module 1302 determines, in the last N consecutive symbols of the downlink pilot timeslot, the guard period for retuning, where the first indication information is used to instruct the terminal device to determine the guard period in the last N consecutive symbols of the downlink pilot timeslot.

In a possible design, the receiving module 1303 is specifically configured to:

receive radio resource control signaling, where the radio resource control signaling carries the first indication information; or receive downlink control information, where the downlink control information includes the first indication information.

In a possible design, the apparatus further includes:

a receiving module 1303, configured to receive second indication information before the second determining module 1302 determines, in the uplink pilot timeslot, the guard period for retuning.

The second indication information is used to indicate that the guard period is in the uplink pilot timeslot.

In a possible design, the receiving module 1303 is specifically configured to:

receive radio resource control signaling, where the radio resource control signaling carries the second indication information; or receive downlink control information, where the downlink control information includes the second indication information.

In a possible design, the first frequency domain resource is a narrowband resource, and bandwidth of the second frequency domain resource is equal to transmission bandwidth of the sounding reference signal.

In a possible design, bandwidth of the narrowband resource is equal to maximum bandwidth that can be supported by the terminal device, or bandwidth of the narrowband resource is equal to a maximum quantity of physical resource blocks that can be supported by the terminal device.

In a possible design, the terminal device is a bandwidth-reduced low-complexity (BL) terminal device, a coverage enhanced (CE) terminal device, or a machine type communication (MTC) terminal device.

Module division in the embodiments of this application is an example, is merely logical function division, and may be other division during actual implementation. In addition, functional modules in the embodiments of this application may be integrated into one processor, or may exist alone physically, or two or more modules may be integrated into one module. The integrated module may be implemented in a form of hardware, or may be implemented in a form of a software functional module.

Figure 14:
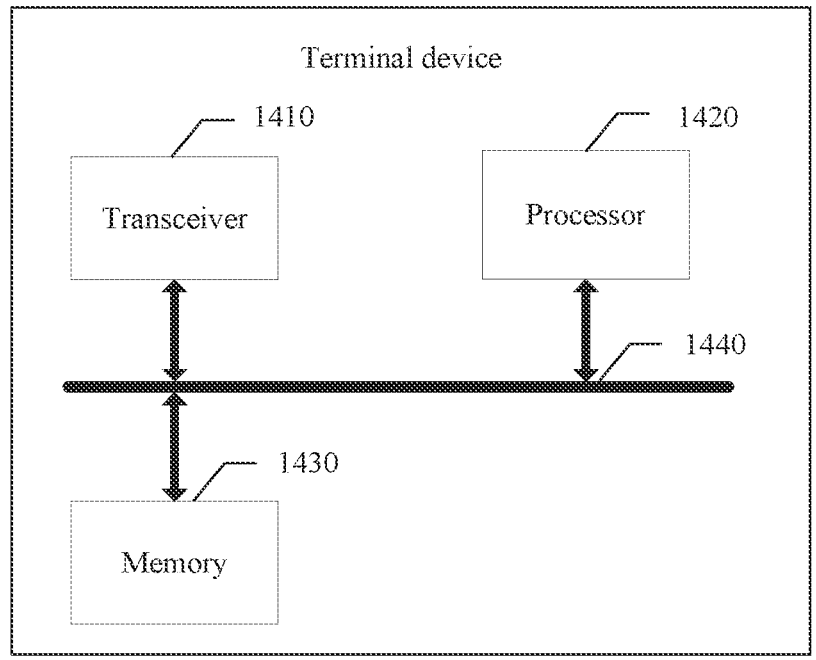
FIG. 14 is a schematic diagram of a terminal device according to an embodiment of this application.

As shown in FIG. 14, a terminal device may include a processor 1420. Hardware of entities corresponding to the modules shown in FIG. 12 or FIG. 13 may be the processor 1420. The processor 1420 may be a central processing unit (CPU), a digital processing module, or the like. The terminal device may further include a transceiver 1410. The processor 1420 receives data and a message by using the transceiver 1410. The terminal device may further include a memory 1430, configured to store a program to be executed by the processor 1420. The memory 1430 may be a non-volatile memory such as a hard disk (HDD) or a solid-state drive (SSD), or may be a volatile memory such as a random access memory (RAM). The memory 1430 is any other medium that can be configured to carry or store desired program code in a form of an instruction or a data structure and that can be accessed by a computer, but is not limited thereto.

The processor 1420 is configured to execute the program code stored in the memory 1430, and is specifically configured to perform the methods performed by the terminal device in the embodiments shown in FIG. 3 to FIG. 11. For details, refer to the method implementation described in the embodiments shown in FIG. 3 to FIG. 11. The details are not described herein again in this application.

A specific connection medium between the transceiver 1410, the processor 1420, and the memory 1430 is not limited in this embodiment of this application. In this embodiment of this application, the memory 1430, the processor 1420, and the transceiver 1410 are connected by using a bus 1440 in FIG. 14. The bus is represented by using a bold line in FIG. 14. A manner of connection between other components is merely an example for description, and imposes no limitation. The bus may be classified into an address bus, a data bus, a control bus, and the like. For ease of representation, only one bold line is used in FIG. 14 to represent the bus, but it does not indicate that there is only one bus or one type of bus.

Figure 15:
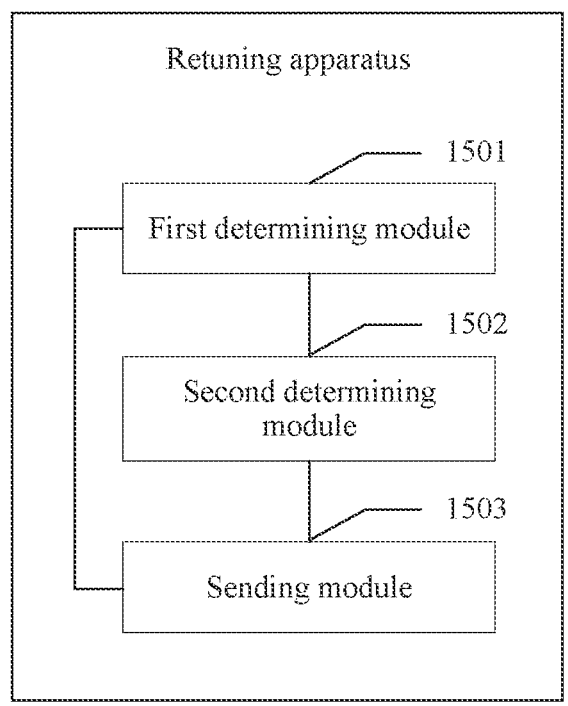
FIG. 15 is a schematic diagram of a retuning apparatus applied to a network device in a scenario 1 according to an embodiment of this application.

Based on a same inventive concept as the embodiment corresponding to the method provided in the scenario 1, an embodiment of this application provides a retuning apparatus. The apparatus is applied to a network device. As shown in FIG. 15, the apparatus includes:

a first determining module 1501, configured to determine a guard period for retuning from a first resource to a second resource by a terminal device, where the guard period is in a first subframe and/or a second subframe, the guard period is used to forbid the terminal device to send an uplink signal in the guard period, the first resource is used by the terminal device to send a sounding reference signal, the first resource is determined based on a first frequency domain resource and at least one symbol of the first subframe, and the at least one symbol includes the last symbol of the first subframe; the second resource is used by the terminal device to send a physical uplink control channel or a physical uplink shared channel, the second resource is determined based on a second frequency domain resource and the second subframe, and all or a part of the first frequency domain resource is not in the second frequency domain resource; and the first subframe is the first subframe in two consecutive subframes, and the second subframe is the second subframe in the two consecutive subframes; and a second determining module 1502, configured to determine that no uplink signal of the terminal device exists in the guard period.

In a possible design, the apparatus further includes:

a sending module 1503, configured to send first indication information to the terminal device, where the first indication information is used to indicate that the guard period is in the first subframe and/or the second subframe.

In a possible design, the first indication information is used to indicate that the guard period is in the first symbol in a plurality of consecutive symbols in the second subframe that are used to send the physical uplink shared channel or the physical uplink control channel.

In a possible design, the first indication information is used to indicate that the guard period is in the last symbol of the first subframe and the first symbol in a plurality of symbols in the second subframe that are used by the terminal device to send the physical uplink control channel.

In a possible design, the first indication information is used to indicate that the guard period is in the first two symbols in a plurality of symbols in the second subframe that are used by the terminal device to send the physical uplink shared channel.

In a possible design, the sending module 1503 is specifically configured to: send radio resource control signaling to the terminal device, where the radio resource control signaling carries the first indication information; or send downlink control information to the terminal device, where the downlink control information includes the first indication information.

In a possible design, the apparatus further includes:

a sending module 1503, configured to send second indication information to the terminal device.

The second indication information is used to instruct the terminal device to generate the guard period in the last symbol of the first subframe; or if the sounding reference signal is sent only in the last symbol of the first subframe, the second indication information is used to indicate that the guard period is in the last symbol of the first subframe and the first symbol of the second subframe; or if the sounding reference signal is sent in at least two consecutive symbols of the first subframe, and the at least two consecutive symbols include the last two symbols of the first subframe, the second indication information is used to indicate that the guard period is in the last two symbols of the first subframe.

In a possible design, the sending module 1503 is specifically configured to:

send radio resource control signaling to the terminal device, where the radio resource control signaling carries the second indication information, or send downlink control information to the terminal device, where the downlink control information includes the second indication information.

Figure 16:
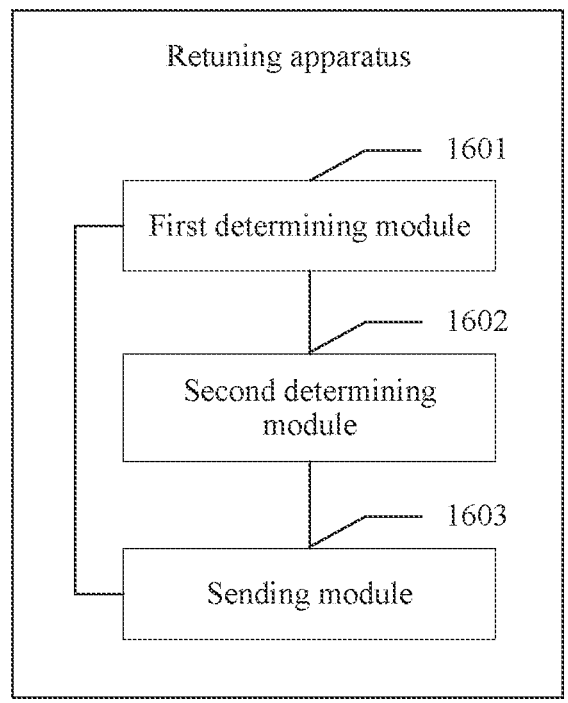
FIG. 16 is a schematic diagram of a retuning apparatus applied to a network device in a scenario 2 according to an embodiment of this application.

Based on a same inventive concept as the embodiment corresponding to the method provided in the scenario 2, an embodiment of this application provides a retuning apparatus. The apparatus is applied to a network device. As shown in FIG. 16, the apparatus includes:

a first determining module 1601, configured to determine a guard period for retuning from a first resource to a second resource by a terminal device, where the guard period is in the last N consecutive symbols of a downlink pilot timeslot in a special subframe or the guard period is in an uplink pilot timeslot, and the guard period is used to forbid the terminal device to transmit/receive a signal in the guard period; the first resource is used to receive a physical downlink control channel or a physical downlink shared channel, and the first resource is determined based on a first frequency domain resource and M consecutive symbols of the downlink pilot timeslot; the second resource is used to send a sounding reference signal, the second resource is determined based on a second frequency domain resource and the uplink pilot timeslot in the special subframe, and all or a part of the second frequency domain resource is not in the first frequency domain resource; and both M and N are positive integers, and M is greater than or equal to N; and a second determining module 1602, configured to determine that no signal of the terminal device exists in the guard period.

In a possible design, the apparatus further includes:

a sending module 1603, configured to send indication information to the terminal device, where the indication information is used to indicate that the guard period is in the last N consecutive symbols of the downlink pilot timeslot or indicate that the guard period is in the uplink pilot timeslot.

In a possible design, the sending module 1603 is specifically configured to:

send radio resource control signaling to the terminal device, where the radio resource control signaling carries the indication information; or send downlink control information to the terminal device, where the downlink control information includes the indication information.

Module division in the embodiments of this application is an example, is merely logical function division, and may be other division during actual implementation. In addition, functional modules in the embodiments of this application may be integrated into one processor, or may exist alone physically, or two or more modules may be integrated into one module. The integrated module may be implemented in a form of hardware, or may be implemented in a form of a software functional module.

Figure 17:
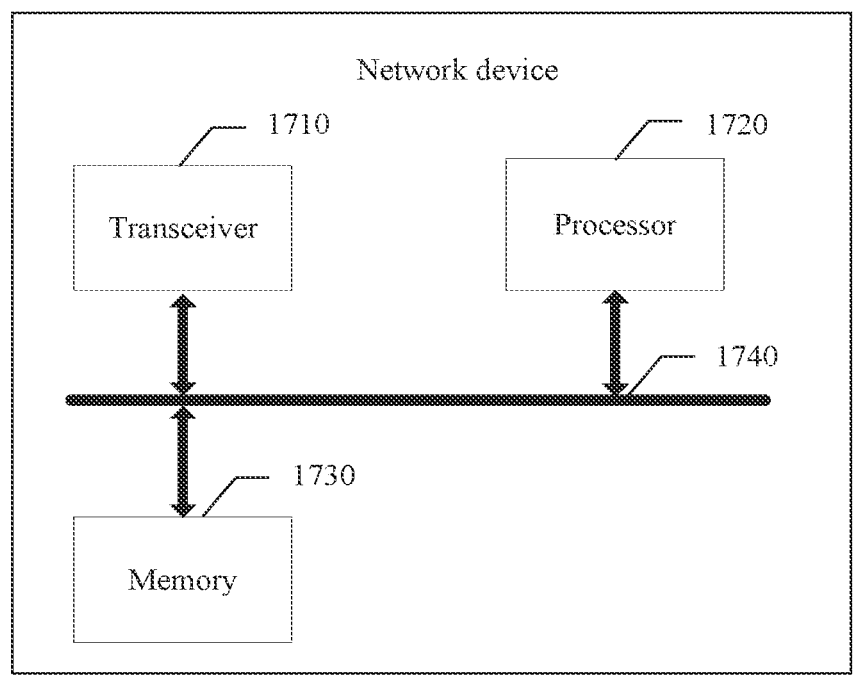
FIG. 17 is a schematic diagram of a network device according to an embodiment of this application.

As shown in FIG. 17, a network device may include a processor 1720. Hardware of entities corresponding to the modules shown in FIG. 15 or FIG. 16 may be the processor 1720. The processor 1720 may be a CPU, a digital processing module, or the like. The network device may further include a transceiver 1710. The processor 1720 receives data and a message by using the transceiver 1710. The network device may further include a memory 1730, configured to store a program to be executed by the processor 1720. The memory 1730 may be a nonvolatile memory such as an HDD or an SSD, or may be a volatile memory such as a RAM. The memory 1730 is any other medium that can be configured to carry or store desired program code in a form of an instruction or a data structure and that can be accessed by a computer, but is not limited thereto.

The processor 1720 is configured to execute the program code stored in the memory 1730, and is specifically configured to perform the methods performed by the network device in the embodiments shown in FIG. 3 to FIG. 11. For details, refer to the method implementation described in the embodiments shown in FIG. 3 to FIG. 11. The details are not described herein again in this application.

A specific connection medium between the transceiver 1710, the processor 1720, and the memory 1730 is not limited in this embodiment of this application. In this embodiment of this application, the memory 1730, the processor 1720, and the transceiver 1710 are connected by using a bus 1740 in FIG. 17. The bus is represented by using a bold line in FIG. 17. A manner of connection between other components is merely an example for description, and imposes no limitation. The bus may be classified into an address bus, a data bus, a control bus, and the like. For ease of representation, only one bold line is used in FIG. 17 to represent the bus, but it does not indicate that there is only one bus or one type of bus.

In the embodiments of this application. SRS sending is not preferentially dropped. Instead, SRS transmission is chosen to be preferentially reserved. Transmission of a signal less important than the SRS is preferentially dropped, to enhance SRS coverage based on terminal retuning. In addition, the network device instructs, by using higher layer signaling, the terminal device to preferentially drop SRS transmission or preferentially reserve SRS transmission. This improves symbol dropping and reserving flexibility during retuning.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk storage, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the embodiments of this application without departing from the spirit and scope of the embodiments of this application. This application is intended to cover these modifications and variations provided that they fall within the scope of protection defined by the claims of this application and their equivalent technologies.

What is claimed is:

1. A retuning method, comprising:
determining, by a terminal device, a first resource and a second resource, wherein the first resource is used to receive a physical downlink control channel or a physical downlink shared channel, wherein the first resource is determined based on a first frequency domain resource and M consecutive symbols of a downlink pilot timeslot in a special subframe, wherein the second resource is used to send a sounding reference signal, wherein the second resource is determined based on a second frequency domain resource and an uplink pilot timeslot in the special subframe, and wherein all or a part of the second frequency domain resource is not in the first frequency domain resource; and
determining, by the terminal device in the last N consecutive symbols of the downlink pilot timeslot, a guard period for retuning, wherein the guard period is used to forbid the terminal device to transmit or receive a signal in the guard period, wherein both M and N are positive integers, and wherein M is greater than or equal to N.

2. The method according to claim 1, before the determining, by the terminal device in the last N consecutive symbols of the downlink pilot timeslot, a guard period for retuning, further comprising:
receiving, by the terminal device, first indication information, wherein the first indication information is used to indicate the terminal device to determine the guard period in the last N consecutive symbols of the downlink pilot timeslot.

3. The method according to claim 2, wherein the receiving, by the terminal device, first indication information comprises:
receiving, by the terminal device, radio resource control signaling, wherein the radio resource control signaling carries the first indication information.

4. The method according to claim 1, wherein the first frequency domain resource is a narrowband resource, and wherein bandwidth of the second frequency domain resource is equal to transmission bandwidth of the sounding reference signal.

5. The method according to claim 1, wherein the terminal device is a bandwidth-reduced low-complexity (BL) terminal device, a coverage enhanced (CE) terminal device, or a machine type communication (MTC) terminal device.

6. A retuning method, comprising:
determining, by a network device, a guard period for retuning from a first resource to a second resource by a terminal device, wherein the guard period is in the last N consecutive symbols of a downlink pilot timeslot in a special subframe, wherein the guard period is used to forbid the terminal device to transmit or receive a signal in the guard period, wherein the first resource is used to send a physical downlink control channel or a physical downlink shared channel, wherein the first resource is determined based on a first frequency domain resource and M consecutive symbols of the downlink pilot timeslot, wherein the second resource is used to receive a sounding reference signal, the second resource is determined based on a second frequency domain resource and go uplink pilot timeslot in the special subframe, wherein all or a part of the second frequency domain resource is not in the first frequency domain resource, wherein both M and N are positive integers, and wherein M is greater than or equal to N; and
determining, by the network device, that no signal of the terminal device exists in the guard period.

7. The method according to claim 6, wherein the method further comprises:
sending, by the network device, indication information to the terminal device, wherein the indication information is used to indicate that the guard period is in the last N consecutive symbols of the downlink pilot timeslot.

8. The method according to claim 7, wherein the sending, by the network device, indication information to the terminal device comprises:
sending, by the network device, radio resource control signaling to the terminal device, wherein the radio resource control signaling carries the indication information.

9. The method according to claim 6, wherein the first frequency domain resource is a narrowband resource, and wherein bandwidth of the second frequency domain resource is equal to transmission bandwidth of the sounding reference signal.

10. A retuning apparatus, comprising:
a memory storing program instructions; and
at least one processor coupled to the memory, wherein the program instructions, when executed by the at least one processor, cause the apparatus to:
determine a first resource and a second resource, wherein the first resource is used to receive a physical downlink control channel or a physical downlink shared channel, wherein the first resource is determined based on a first frequency domain resource and M consecutive symbols of a downlink pilot timeslot in a special subframe, wherein the second resource is used to send a sounding reference signal, wherein the second resource is determined based on a second frequency domain resource and an uplink pilot timeslot in the special subframe, and wherein all or a part of the second frequency domain resource is not in the first frequency domain resource; and determine, in the last N consecutive symbols of the downlink pilot timeslot, a guard period for retuning, wherein the guard period is used to forbid the apparatus to transmit or receive a signal in the guard period, wherein both M and N are positive integers, and wherein M is greater than or equal to N.

11. The apparatus according to claim 10, wherein the program instructions, when executed by the at least one processor, cause the apparatus to:

receive first indication information, wherein the first indication information is used to indicate the apparatus to determine the guard period in the last N consecutive symbols of the downlink pilot timeslot.

12. The apparatus according to claim 11, wherein the program instructions, when executed by the at least one processor, cause the apparatus to:

receive radio resource control signaling, wherein the radio resource control signaling carries the first indication information.

13. The apparatus according to claim 10, wherein the first frequency domain resource is a narrowband resource, and wherein bandwidth of the second frequency domain resource is equal to transmission bandwidth of the sounding reference signal.

14. The apparatus according to claim 10, wherein the apparatus is a bandwidth-reduced low-complexity (BL) terminal device, a coverage enhanced (CE) terminal device, or a machine type communication (MTC) terminal device.

15. A network device, comprising:

a memory storing program instructions; and at least one processor coupled to the memory, wherein the program instructions, when executed by the at least one processor, cause the network device to:

determine a guard period for retuning from a first resource to a second resource by a terminal device, wherein the guard period is in the last N consecutive symbols of a downlink pilot timeslot in a special subframe, wherein the guard period is used to forbid the terminal device to transmit or receive a signal in the guard period, wherein the first resource is used to send a physical downlink control channel or a physical downlink shared channel, wherein the first resource is determined based on a first frequency domain resource and M consecutive symbols of the downlink pilot timeslot, wherein the second resource is used to receive a sounding reference signal, wherein the second resource is determined based on a second frequency domain resource and an uplink pilot timeslot in the special subframe, wherein all or a part of the second frequency domain resource is not in the first frequency domain resource, wherein both M and N are positive integers, and M is greater than or equal to N; and determine that no signal of the terminal device exists in the guard period.

16. The network device according to claim 15, wherein the program instructions, when executed by the at least one processor, cause the network device to:

send indication information to the terminal device, wherein the indication information is used to indicate that the guard period is in the last N consecutive symbols of the downlink pilot timeslot.

17. The network device according to claim 16, wherein the program instructions, when executed by the at least one processor, cause the network device to:

send radio resource control signaling to the terminal device, wherein the radio resource control signaling carries the indication information.

18. The network device according to claim 15, wherein the first frequency domain resource is a narrowband resource, and wherein bandwidth of the second frequency domain resource is equal to transmission bandwidth of the sounding reference signal.

* * * * *

UNITED STATES PATENT AND TRADEMARK OFFICE
CERTIFICATE OF CORRECTION

| | |
|---|---|
| PATENT NO. | : 11,632,763 B2 |
| APPLICATION NO. | : 17/348160 |
| DATED | : April 18, 2023 |
| INVENTOR(S) | : Yongqiang Fei, Zheng Yu and Xingqing Cheng |

It is certified that error appears in the above-identified patent and that said Letters Patent is hereby corrected as shown below:

In the Claims

In Column 32, Line 26, in Claim 6, delete "go" and insert -- an --.

Signed and Sealed this
Fourth Day of July, 2023

Katherine Kelly Vidal
*Director of the United States Patent and Trademark Office*